United States Patent
Kocak et al.

(10) Patent No.: US 11,692,085 B2
(45) Date of Patent: Jul. 4, 2023

(54) GEOMEMBRANES AND METHODS FOR MAKING AND USING THE SAME

(71) Applicant: University of South Florida, Tampa, FL (US)

(72) Inventors: Yasin Kocak, Tampa, FL (US); Manoj K. Ram, Tampa, FL (US); Venkat Bhethanabotla, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 173 days.

(21) Appl. No.: 17/200,603

(22) Filed: Mar. 12, 2021

(65) Prior Publication Data

US 2021/0292526 A1    Sep. 23, 2021

Related U.S. Application Data

(60) Provisional application No. 62/705,141, filed on Jun. 12, 2020, provisional application No. 62/991,176, filed on Mar. 18, 2020.

(51) Int. Cl.
*C08L 23/06* (2006.01)
*C08L 23/12* (2006.01)

(52) U.S. Cl.
CPC .............. *C08L 23/06* (2013.01); *C08L 23/12* (2013.01); *C08L 2201/08* (2013.01); *C08L 2201/14* (2013.01); *C08L 2205/025* (2013.01); *C08L 2207/062* (2013.01); *C08L 2207/066* (2013.01)

(58) Field of Classification Search
CPC . C08L 23/06; C08L 2207/062; C08L 2201/08
See application file for complete search history.

(56) References Cited

U.S. PATENT DOCUMENTS

| | | | |
|---|---|---|---|
| 2004/0030009 A1* | 2/2004 | Gugumus | C08K 5/0041 524/86 |
| 2007/0193643 A1* | 8/2007 | Jarvenkyla | F16L 9/147 138/140 |
| 2010/0292383 A1* | 11/2010 | Fader | C08K 3/04 524/426 |
| 2011/0224338 A1* | 9/2011 | Maziers | C08K 5/005 524/133 |
| 2017/0320303 A1* | 11/2017 | Taghizadeh | B29C 48/21 |
| 2022/0041846 A1* | 2/2022 | Weyland | C08L 23/06 |
| 2022/0145053 A1* | 5/2022 | King, III | C08K 3/22 |
| 2022/0234986 A1* | 7/2022 | Harauchi | C07C 69/54 |

FOREIGN PATENT DOCUMENTS

| | | | |
|---|---|---|---|
| GB | 2322374 | * | 8/1998 |
| WO | 2016/115636 A1 | | 7/2016 |

OTHER PUBLICATIONS

Mueller et al. "Oxidative resistance of high-density polyethylene geomembranes." Polymer Degradation and Stability 79.1 (2003): 161-172.

Rowe et al. "Depletion of antioxidants from a HDPE geomembrane in a composite liner." Journal of Geotechnical and Geoenvironmental Engineering 134.1 (2008): 68-78.

* cited by examiner

*Primary Examiner* — Jeffrey C Mullis

(74) *Attorney, Agent, or Firm* — Quarles & Brady LLP

(57) ABSTRACT

Described herein are geomembranes with improved chemical, physical, and mechanical properties. In one aspect, the geomembrane includes polyethylene, a phenolic antioxidant, a phosphite antioxidant, a hindered amine light stabilizer, and carbon black. Also described herein are methods for making the geomembranes described herein.

20 Claims, 9 Drawing Sheets

GEOMEMBRANES AND METHODS FOR MAKING AND USING THE SAME

CROSS-REFERENCE TO RELATED APPLICATIONS

This application claims the benefit of and priority to U.S. Provisional Patent Application Nos. 62/991,176, filed on Mar. 18, 2020, and 62/705,141, filed on Jun. 12, 2020, the contents of which are incorporated by reference herein in their entireties.

BACKGROUND

It is predicted that two billion people in 2040 will not able to access freshwater. According to this estimation, water should be transferred without leakage from water sources to cities where water needs. The low impermeable liner systems which are concrete, bitumen, soil amendments, compacted soils, clay or geosynthetics, can be utilized to transfer or store water. These liner materials have different properties in terms of the level of impermeability, constructability, cost, and durability. In developing countries, geosynthetic materials such as geomembranes can provide cost-effective solutions to prevent fresh drinkable water (Blond et. al., 2019).

Geomembranes are more impermeable than geotextiles, soils and clay soils which are used as barriers because geomembranes are effective in limiting the transport of liquids, contaminants, vapors and diffusion of ions (Ewais, A. M. R. 2014, p. 1; Koerner, R. M., 2012, Kindle Locations p. 249-251). Geomembranes are an effective alternative approach to carry water without leakage for long distances via canals and to store water in dams and reservoirs instead of traditional lining methods such as concrete and compacted soils (Stark, T. D., & Hynes, J. M., 2009, p. 54). However, a major question for all kinds of geomembranes is their durability over time.

SUMMARY

In accordance with the purpose(s) of the present disclosure, as embodied and broadly described herein are geomembranes with improved chemical, physical, and mechanical properties. In one aspect, the geomembrane includes polyethylene, a phenolic antioxidant, a phosphite antioxidant, a hindered amine light stabilizer, and carbon black. Also described herein are methods for making the geomembranes described herein.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figures 1A, 1B:
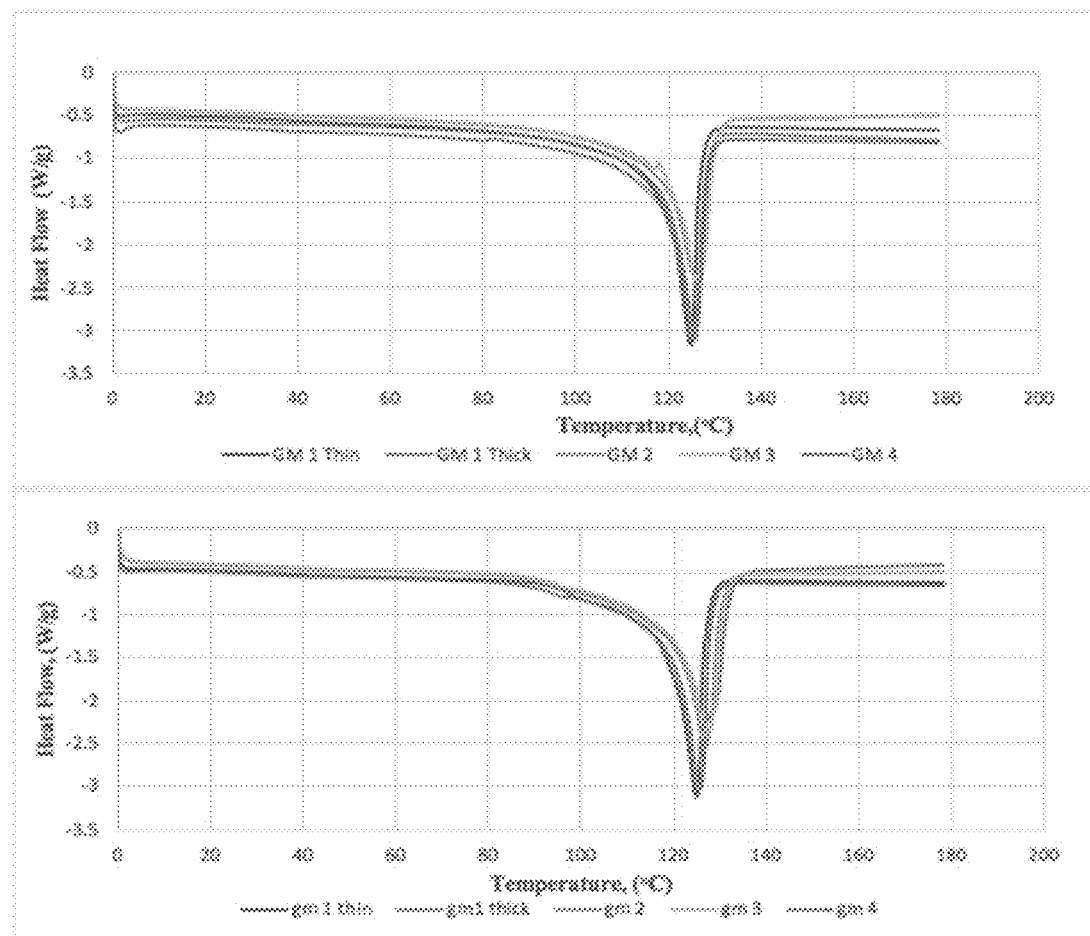
FIGS. 1A-1B show the DSC curves for (a) unaged (b) 6 months aged geomembranes.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a metal," "a catalyst," or "a product," include, but are not limited to, combinations or mixtures of two or more such metals, catalysts, or products, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

As used herein, the term "admixing" is defined as mixing two or more components together so that there is no chemical reaction or physical interaction. The term "admixing" also includes the chemical reaction or physical interaction between the two or more components.

As used herein, the term "geomembrane" is a very low permeability synthetic membrane liner or barrier used with any geotechnical engineering related material so as to control fluid (or gas) migration in a human-made project, structure, or system (ASTM D4439).

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" is any carbon-based aromatic group including, but not limited to, benzene, naphthalene, etc. The term "aryl group" also includes "heteroaryl group," which is defined as an aryl group that has at least one heteroatom incorporated within the ring of the aromatic ring. Examples of heteroatoms include, but are not limited to, nitrogen, oxygen, sulfur, and phosphorus. In one aspect, the heteroaryl group is imidazole. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy. In one aspect, the aryl amine is aniline.

Geomembranes

Described herein are geomembranes with improved chemical, physical, and mechanical properties. In one aspect, the geomembrane includes polyethylene, a phenolic antioxidant, a phosphite antioxidant, a hindered amine light stabilizer, and carbon black. As will be demonstrated herein, modifying the relative amounts of the phenolic antioxidant, phosphite antioxidant, hindered amine light stabilizer, and carbon black can result in the formation of geomembranes with improved properties.

The geomembranes described herein can be produced using techniques know in the art. In one aspect, the geomembrane is produced by (a) admixing polyethylene, a phenolic antioxidant, a phosphite antioxidant, a hindered amine light stabilizer, and carbon black to produce a first composition, and (b) extruding the first composition to produce the geomembrane. The polyethylene, phenolic antioxidant, phosphite antioxidant, hindered amine light stabilizer, and carbon black can be admixed using techniques and equipment known in the art. In one aspect, the polyethylene, phenolic antioxidant, phosphite antioxidant, hindered amine light stabilizer, and carbon black are admixed in dry form to ensure the components are evenly (i.e., homogeneously) dispersed with one another.

The mixture of polyethylene, phenolic antioxidant, phosphite antioxidant, hindered amine light stabilizer, and carbon black is then extruded to produce thin sheets of the geomembrane. In one aspect, a molten mix of the polyethylene, phenolic antioxidant, phosphite antioxidant, hindered amine light stabilizer, and carbon black is extruded to produce the geomembrane. The geomembrane can be subsequently processed to produce the geomembrane with specific dimensions. In one aspect, the geomembrane has a thickness of from about 0.1 mm to about 10 mm, or about 0.1 mm, 0.5 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm, where any value can be a lower and upper endpoint of a range (e.g., 0.5 mm to 2 mm, etc.). In one aspect, the geomembrane has a melt flow rate of from about 0.05 g/10 minutes to 0.30 g/10 minutes, or about 0.05 g/10 minutes, 0.10 g/10 minutes, 0.15 g/10 minutes, 0.20 g/10 minutes, 0.25 g/10 minutes, or 0.30 g/10 minutes, where any value can be a lower and upper endpoint of a range (e.g., 0.10 g/10 minutes to 0.25 g/10 minutes, etc.).

In one aspect, the polyethylene in the geomembrane is high density polyethylene (HDPE). In one aspect, the high density polyethylene in the geomembrane has a density greater than or equal to 0.941 g/cm$^3$. In one aspect, low density polyethylene can be used to produce the geomembrane. In another aspect, medium density polyethylene can be used to produce the geomembrane. In one aspect, the medium density polyethylene has a density of from about 0.90 g/cm$^3$ to 0.95 g/cm$^3$, or about 0.90 g/cm$^3$, 0.905 g/cm$^3$, 0.910 g/cm$^3$, 0.915 g/cm$^3$, 0.920 g/cm$^3$, 0.925 g/cm$^3$, 0.930 g/cm$^3$, 0.935 g/cm$^3$, 0.940 g/cm$^3$, 0.945 g/cm$^3$, or 0.950 g/cm$^3$, where any value can be a lower and upper endpoint of a range (e.g., 0.910 g/cm$^3$ to 0.930 g/cm$^3$, etc.). In another aspect, the medium density polyethylene has a melt flow rate of from about 0.05 g/10 minutes to 0.30 g/10 minutes, or about 0.05 g/10 minutes, 0.10 g/10 minutes, 0.15 g/10 minutes, 0.20 g/10 minutes, 0.25 g/10 minutes, or 0.30 g/10 minutes, where any value can be a lower and upper endpoint of a range (e.g., 0.10 g/10 minutes to 0.25 g/10 minutes, etc.).

The phenolic antioxidant is a compound possessing one or more substituted or unsubstituted phenol groups. In one aspect, the phenolic antioxidant is a sterically hindered phenolic antioxidant, where the phenol ring is substituted with one or more alkyl groups such as, for example, methyl, ethyl, isopropyl, tert-butyl, and the like.

In one aspect, the phenolic antioxidant is an alkylated monophenol, an alkylthio methyl phenol, a hydroxylated thiodiphenylether, an alkylidene bisphenol, a hydroxybenzylated malonate, an aromatic hydroxybenzyl compound, an aromatic hydroxybenzyl compound, a triazine compound, a benzylphosphonate, or an acylaminophenol. In another aspect, the phenolic antioxidant comprises an aromatic hydroxybenzyl compound comprising 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, or 2,4,6-tris(3,5-di-tert-butyl-4-hydroxybenzyl)phenol. In another aspect, the phenolic antioxidant is Irganox®® 1330 manufactured by BASF, which is 3,3',3',5,5',5'-hexa-tert-butyl-a,a',a'-(mesitylene-2,4,6-triyl)tri-p-cresol. In another aspects, the phenolic antioxidant is Irganox®® 1010, Irganox®® 1076, Irganox®® 1098, Irganox®® 1425 WL, Irganox®® 3114, Irganox®® 245 or Irganox®® 1135.

In one aspect, the phenolic antioxidant is present in the geomembrane of from about 500 ppm to about 10,000 ppm. In another aspect, the phenolic antioxidant is present in the geomembrane of about 500 ppm, 1,000 ppm, 1,500 ppm, 2,000 ppm, 2,500 ppm, 3,000 ppm, 3,500 ppm, 4,000 ppm, 4,500 ppm, 5,000 ppm, 5,500 ppm, 6,000 ppm, 6,500 ppm, 7,000 ppm, 7,500 ppm, 8,000 ppm, 8,0500 ppm, 9,000 ppm, 9,500 ppm, or 10,000 ppm, where any value can be a lower and upper endpoint of a range (e.g., 1,000 ppm to 6,500 ppm, etc.).

The phosphite antioxidant is a compound of the general formula $P(OR)_3$, where each R groups is independently an alkyl group or an aryl group. In one aspect, the phosphite antioxidant comprises a triphenylphosphite, a diphenylalkylphosphite, a phenyldialkylphosphite, a tri(nonylphenyl)phosphite, a trilaurylphosphite, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl) pentaerythritoldiphosphite, tristearylsorbitoltriphosphite, bis(2,4-di-tert-butyl-6-methylphenyl) ethylphosphite, or 2-ethylhexyl(3,3',5,5'-tetra-tert-butyl-1,1'-biphenyl-2,2'-diyl))phosphite. In another aspect, the phosphite antioxidant comprises a substituted triphenyl phosphite. In another aspect, the phosphite antioxidant is Irfagos®® 168 manufactured by BASF, which is tris(2,4-di-tert-butylphenyl)phosphite.

In one aspect, the phosphite antioxidant is present in the geomembrane of from about 500 ppm to about 10,000 ppm. In another aspect, the phosphite antioxidant is present in the geomembrane of about 500 ppm, 1,000 ppm, 1,500 ppm, 2,000 ppm, 2,500 ppm, 3,000 ppm, 3,500 ppm, 4,000 ppm, 4,500 ppm, 5,000 ppm, 5,500 ppm, 6,000 ppm, 6,500 ppm, 7,000 ppm, 7,500 ppm, 8,000 ppm, 8,0500 ppm, 9,000 ppm, 9,500 ppm, or 10,000 ppm, where any value can be a lower and upper endpoint of a range (e.g., 1,000 ppm to 6,500 ppm, etc.).

The hindered amine light stabilizer is a compound having a plurality of sterically hindered amine groups. In one aspect, hindered amine light stabilizer is a polymer having a plurality of sterically hindered amine groups. In one aspect, hindered amine light stabilizer is a polymer having a plurality of sterically hindered cycloamine groups, where the cycloamine group is a 3 to 7 member ring. In one aspect, hindered amine light stabilizer is a polymer having a plurality of sterically hindered piperidine groups. In one aspect, the hindered amine light stabilizer is 4-hydroxy-2,2,6,6-tetramethyl-1-piperidine ethanol; poly[[6-((1,1,3,3-tetramethylbutyl)amino)-1,3,5-triazine2,4diyl][(2,2,6,6-tetramethyl-4-piperidyl)imino]hexamethylene[2,2,6,6-tetramethyl-4-piperidyl)imino]]; or 1,5,8,12-Tetrakis[4,6-bis(N-butyl-N-1,2,2,6,6-pentamethyl-4-piperidylamino)-1,3,5-triazin-2-yl]-1,5,8,12-tetraazadodecane. In another aspect, the hindered amine light stabilizer is CHIMASSORB®® 944 manufactured by BASF, which is poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

The geomembrane of claim 1, wherein the hindered amine light stabilizer comprises poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

In one aspect, the hindered amine light stabilizer is present in the geomembrane of from about 500 ppm to about 10,000 ppm. In another aspect, the hindered amine light stabilizer is present in the geomembrane of about 500 ppm, 1,000 ppm, 1,500 ppm, 2,000 ppm, 2,500 ppm, 3,000 ppm, 3,500 ppm, 4,000 ppm, 4,500 ppm, 5,000 ppm, 5,500 ppm, 6,000 ppm, 6,500 ppm, 7,000 ppm, 7,500 ppm, 8,000 ppm, 8,0500 ppm, 9,000 ppm, 9,500 ppm, or 10,000 ppm, where any value can be a lower and upper endpoint of a range (e.g., 1,000 ppm to 6,500 ppm, etc.).

Different types of carbon black can be selected to produce the geomembranes described herein. In one aspect, the carbon black is furnace black (17-70 nm), impingement black (10-27 nm), thermal black (150-500 nm), lamp black (50-90 nm) and acetylene black (35-50 nm). In one aspect, the carbon black has an average particle size of from 5 nm to 1,000 nm, or about 5 nm, 10 nm, 25 nm, 50 nm, 75 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm, where any value can be a lower and upper endpoint of a range (e.g., 10 nm to 100 nm, etc.). In one aspect, the carbon black has a density of from about 1.0 $gm/cm^3$ to about 1.5 $gm/cm^3$, or 1.0 $gm/cm^3$, 1.15 $gm/cm^3$, 1.2 $gm/cm^3$, 1.25 $gm/cm^3$, 1.3 $gm/cm^3$, 1.35 $gm/cm^3$, 1.4 $gm/cm^3$, 1.45 $gm/cm^3$, or 1.5 $gm/cm^3$, where any value can be a lower and upper endpoint of a range (e.g., 1.15 $gm/cm^3$ to 1.4 $gm/cm^3$, etc.).

The amount of the carbon black can vary. In one aspect, the carbon black is present in the geomembrane of from about 0.5 weight percent to about 5.0 weight percent, or about 0.5 weight percent, 1.0 weight percent, 1.5 weight percent, 2.0 weight percent, 2.5 weight percent, 3.0 weight percent, 3.5 weight percent, 4.0 weight percent, 4.5 weight percent, or 5.0 weight percent, where any value can be a lower and upper endpoint of a range (e.g., 1.0 weight percent to 3.0 weight percent, etc.).

The geomembranes described herein can be used in different kinds of civil engineering applications such as, for example, landfills, reservoirs, dams, and canals. By adjusting the amounts of the phenolic antioxidant, phosphite antioxidant, hindered amine light stabilizer, and carbon black, the properties of the geomembrane can be adjusted for the specific environments. The geomembranes demonstrate little to no degradation over time and are strong materials, which is a desirable feature geomembranes due to their extended use over time.

In one aspect, when the geomembrane has a thickness of 0.5 mm, the geomembrane has a stress at yield of greater than 15 MPa in the machine direction as determined by ASTM D6693 Type IV and a break of greater than 25 MPa in the machine direction as determined by ASTM D6693 Type IV. In another aspect, the geomembrane has a thickness of 0.5 mm, the geomembrane has a stress at yield of about 15 MPa to about 50 MPa in the cross-machine direction as determined by ASTM D6693 Type IV and a break of about 25 MPa to about 75 MPa in the cross-machine direction as determined by ASTM D6693 Type IV.

Aspects

Aspect 1. A geomembrane comprising polyethylene, a phenolic antioxidant, a phosphite antioxidant, a hindered amine light stabilizer, and carbon black.

Aspect 2. The geomembrane of Aspect 1, wherein the polyethylene comprises high density polyethylene (HDPE).

Aspect 3. The geomembrane of Aspect 1 or 2, wherein the phenolic antioxidant comprises an alkylated monophenol, an alkylthio methyl phenol, a hydroxylated thiodiphenylether, an alkylidene bisphenol, a hydroxybenzylated malonate, an aromatic hydroxybenzyl compound, an aromatic hydroxybenzyl compound, a triazine compound, a benzylphosphonate, or an acylaminophenol.

Aspect 4. The geomembrane of Aspect 1, w or 2herein the phenolic antioxidant comprises an aromatic hydroxybenzyl compound comprising 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, or 2,4,6-tris(3,5-di-tert-butyl-4-hydroxybenzyl)phenol.

Aspect 5. The geomembrane of Aspect 1 or 2, wherein the phenolic antioxidant comprises 3,3',3',5,5',5'-hexa-tert-butyl-a,a',a'-(mesitylene-2,4,6-tri)tri-p-cresol.

Aspect 6. The geomembrane in any one of Aspects 1 to 5, wherein the phenolic antioxidant is present in the geomembrane of from about 500 ppm to about 10,000 ppm.

Aspect 7. The geomembrane in any one of Aspects 1 to 5, wherein the phosphite antioxidant comprises a triphenylphosphite, a diphenylalkylphosphite, a phenyldialkylphosphite, a tri(nonylphenyl)phosphite, a trilaurylphosphite, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl) pentaerythritoldiphosphite, tristearylsorbitoltriphosphite, bis(2,4-di-tert-butyl-6-methylphenyl)ethylphosphite, or 2-ethylhexyl(3,3',5,5'-tetra-tert-butyl-1,1'-biphenyl-2,2'-diyl))phosphite.

Aspect 8. The geomembrane in any one of Aspects 1 to 5, wherein the phosphite antioxidant comprises a substituted triphenyl phosphite.

Aspect 9. The geomembrane in any one of Aspects 1 to 5, wherein the phosphite antioxidant comprises tris(2,4-di-tert-butylphenyl)phosphite.

Aspect 10. The geomembrane in any one of Aspects 1 to 9, wherein the phosphite antioxidant is present in the geomembrane of from about 500 ppm to about 10,000 ppm.

Aspect 11. The geomembrane in any one of Aspects 1 to 10, wherein the hindered amine light stabilizer comprises a hydroxybenzophenone, a hydroxyphenyl benzotriazole, a cyanoacrylate, an oxanilide, a hydroxyphenyl triazine, or any combination thereof.

Aspect 12. The geomembrane in any one of Aspects 1 to 10, wherein the hindered amine light stabilizer comprises 4-hydroxy-2,2,6,6-tetramethyl-1-piperidine ethanol; poly[[6-((1,1,3,3-tetramethylbutyl)amino)-1,3,5-triazine2,4diyl][(2,2,6,6-tetramethyl-4-piperidyl)imino]hexamethylene[2,2,6,6-tetramethyl-4-piperidyl)imino]]; or 1,5,8,12-Tetrakis[4,6-bis(N-butyl-N-1,2,2,6,6-pentamethyl-4-piperidylamino)-1,3,5-triazin-2-yl]-1,5,8,12-tetraazadodecane.

Aspect 13. The geomembrane in any one of Aspects 1 to 10, wherein the hindered amine light stabilizer comprises poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

Aspect 14. The geomembrane in any one of Aspects 1 to 13, wherein the hindered amine light stabilizer is present in the geomembrane of from about 500 ppm to about 10,000 ppm.

Aspect 15. The geomembrane in any one of Aspects 1 to 14, wherein the carbon black has a density of from about 1.0 gm/cm$^3$ to about 1.5 gm/cm$^3$.

Aspect 16. The geomembrane in any one of Aspects 1 to 15, wherein the carbon black is present in the geomembrane of from about 0.5 weight percent to about 5.0 weight percent.

Aspect 17. The geomembrane in any one of Aspects 1 to 16, wherein the geomembrane is produced by (a) admixing polyethylene, a phenolic antioxidant, a phosphite antioxidant, a hindered amine light stabilizer, and carbon black to produce a first composition, and (b) extruding the first composition to produce the geomembrane.

Aspect 18. The geomembrane of Aspect 17, wherein the polyethylene comprises medium density polyethylene (MDPE), low density polyethylene (LDPE), or polypropylene.

Aspect 19. The geomembrane of Aspect 18, wherein the medium density polyethylene has a density of from about 0.90 g/cm$^3$ to 0.95 g/cm$^3$.

Aspect 20. The geomembrane of Aspect 18, wherein the medium density polyethylene has a melt flow rate of from about 0.05 g/10 minutes to 0.30 g/10 minutes.

Aspect 21. The geomembrane in any one of Aspects 1 to 20, wherein the geomembrane has a thickness of from about 0.1 mm to about 10 mm.

Aspect 22. The geomembrane in any one of Aspects 1 to 21, wherein when the geomembrane has a thickness of 0.5 mm, the geomembrane has a stress at yield of greater than 15 MPa in the machine direction as determined by ASTM D6693 Type IV and a break of greater than 25 MPa in the machine direction as determined by ASTM D6693 Type IV.

Aspect 23. The geomembrane in any one of Aspects 1 to 21, wherein when the geomembrane has a thickness of 0.5 mm, the geomembrane has a stress at yield of about 15 MPa to about 50 MPa in the cross-machine direction as determined by ASTM D6693 Type IV and a break of about 25 MPa to about 75 MPa in the cross-machine direction as determined by ASTM D6693 Type IV.

Aspect 24. The geomembrane in any one of Aspects 1 to 23, wherein the geomembrane has a melt flow rate of from about 0.05 g/10 minutes to 0.30 g/10 minutes.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Materials and Experiments

Irganox®® 1330 was chosen as a phenolic antioxidant in this study. Irfagos®® 168 which is the short-term antioxidant, was chosen to protect geomembrane during the processing because of its low molecular weight and high mobility. Chimassorb®® 944 was chosen as a HALS to protect polymer under the mainly UV degradation.

TABLE 1

Molecular weights and effective temperature ranges of antioxidants in the geomembranes

| Antioxidant | Molecular weight | Stabilizer Effective temperature Range (° C.) |
|---|---|---|
| Irgafos ® 168 (phosphite) | 647 | 150-300 |
| Irganox ®® 1330 (phenolic) | 775 | Up to 300 |
| Chimmassorb ® 944 (high MW HALS) | 2580 | Upto 150 |

To produce the HDPE geomembranes, MDPE resin was used. This resin has 0.938 g/cm³ density and 0.15 g/10 minutes melt mass-flow rate (under 190° C. and 2.16 kg). Polyethylene, Irganox®® 1330, Irfagos®® 168, Chimassaorb® 944 and carbon black were mixed properly. In addition, carbon black which has a density of 1.139 gm/cm3, was used as a pellet because carbon as a powder is difficult to clean and mix. Then, the mix was put in the 21 mm twin Theysohn extruder to obtain polymer sheet in the Polymer Center of Excellence (Charlotte, N.C.). The molten mix is forced through a flat die and then polished cooling rollers to produce a flat geomembrane sheet. The geomembrane thickness is 1 mm except GM 1 thin (0.5 mm). There are four different compositions to compare efficiency in the geomembrane. The compositions of additives in the geomembrane are given in Table 2.

TABLE 2

Composition of the geomembranes

| Samples | Compositions | | | |
|---|---|---|---|---|
| | Carbon black | Irganox ® 1330 | Irfagos ® 168 | Chimassorb ® 944 |
| GM 1 | 2.5% | 3500 ppm | 500 ppm | 5000 ppm |
| GM 1 Thin | 2.5% | 3500 ppm | 500 ppm | 5000 ppm |
| GM 2 | 2.5% | 3500 ppm | 500 ppm | 7000 ppm |
| GM 3 | 2.5% | 5000 ppm | 500 ppm | 5000 ppm |
| GM 4 | 2.5% | 5000 ppm | 500 m | 7000 |

Accelerated Aging Tests

The degradation of the geomembranes in the field is very slow for the investigation and so accelerated aging tests in the laboratory have been used to monitor rapid degradation. Accelerated tests have been studied previously by different groups in the leachate, water, air, hydrocarbons and acidic mine drainage at elevated temperatures to provide beneficial information about changing properties of geomembranes for the field application (Sangam, 2001; Jeon et al., 2008; Islam, 2009; Wong, 2011; Ewais, 2014; Gulec, 2003). In this work, geomembrane samples were incubated in the forced air oven (Across International, FO-19070) at 85° C. to accelerate degradation. Samples were taken during a period of time to monitor the aging of the samples by using FTIR, DSC, TGA, SEM, EDS, XPS, melt index and tensile test.

Crystallinity Test with Differential Scanning Calorimetry (DSC)

Crystallinity test was performed with a TA DSC 2500 (TA Instrument, USA) in compliance with ASTM E793. Then, the samples were cut to weight ranges of 5 to 10 mg and sealed in the $T_{zero}$ pan. Afterward, the samples were heated from 0 to 180° C. at the rate of 10° C./min. These tests were run under the 50 mL/min nitrogen gas flow rate. For this study, crystallization temperatures ($T_c$) and heat of melting were recorded to find the degree of crystallinity ($\chi_c$). The degree of crystallinity can be found using equation 2.1.

$$\chi_c(\%) = \frac{\Delta H_m}{\Delta H_m^{100\%}} \quad \text{(Equation 1)}$$

In equation 1, $\Delta_m^{100\%}$ which is the theoretical melting enthalpy for 100% of crystallinity HDPE, is 290 J/g. Also, $\Delta H_m$ is the melting enthalpy which is calculated by the integrated area between the melting curve and arbitrary baseline (Orden et. al., 2015; Ewais, 2014).

Tensile Test

To learn mechanical properties, the tensile tests (ASTM D6693 Type IV) were conducted by Instron 3366 tensile testing machine. The samples were cut in dumbbell-shaped and then the tests were performed with a 50 mm/min (2 inches/minute) elongation rate. For the machine and cross-machine direction, five experiments for each sample were conducted. Then, elongation and stress at yield and break were evaluated.

Melt Index Test (MI)

Sheny & Saini, (1986) Hsuan & Koerner, (1998), Hsuan & Guan, (1998) and Shah, (2002) expressed that the MI testing method is a qualitative testing method to evaluate molecular weight and give information about changing polymer structure because of oxidative degradation. Therefore, this method indicates the oxidation of geomembranes. The MI value has inversely correlation with molecular weight. In addition, decreasing MI value represents increasing molecular weight due to cross-linking reactions while increasing MI value shows decreasing molecular weight because of chain scission reactions (as cited by Rowe et. al., 2008). According to Schnabel 1981, Hsuan & Guan 1998 and Peacock 2000, the oxidation for polymeric material can give rise to alter molecular weight due to cross-linking or chain scission (as cited by Rimal, 2009). According to ASTM D1238, the melt index test was performed to measure the mass of the molten polymer under test condition of 2.16 kg/190° C. using MP 993 Tinius Olsen Extrusion Plastometer/Melt Indexer.

Fourier Transform Infrared (FTIR)

FTIR is utilized to get infrared spectra of compounds or materials. Thanks to obtaining infrared spectra of compounds or materials, specific functional groups can be identified. The peaks for polyethylene structure are at around 2910 to 2850, 1470 to 1460, and 729 to 719 which are related to anti-symmetric and symmetric stretching vibration, scissor vibration, and rocking modes of the $CH_2$ structures (Wong, 2011). After the period of thermal-oxidative aging, the common carbonyl compounds such as ketones, aldehydes, carboxylic acids, esters, etc. in the geomembrane can be formed. These compounds can be identified between 1630 cm$^{-1}$ and 1750 cm$^{-1}$ using FTIR. (Wong, 2011; Gulec, 2003). Also, FTIR shows different peaks which can be the synergistic and antagonistic interactions between carbon black and antioxidants.

In addition, the carbonyl index (I) is presumably the most common method to measure the chemical oxidation of polyethylene by finding the ratio of the absorbance of the carbonyl peak (1735 cm-1) and the reference peak (2850 cm-1) (Equation 2). (Rouillon et al., 2016; Rodriguez-Vazguez et al., 2006). The reference band (2850 cm-1) which is the absorbance of the symmetric stretching vibration of $CH_2$ at 2850 cm$^{-1}$ was chosen (Rodriguez-Vazguez et al., 2006; Ewais A., 2014). The carbonyl index values were calculated using Equation 2 to monitor the degradation of geomembranes.

$$I = I_{absorbance@1735\ cm-1} / I_{ref.\ absorbance@2850\ cm-1}$$ (Equation 2)

In this study, FTIR-ATR was performed between 400 and 4000 cm-1 wavenumber range at 4 cm-1 resolution with using Thermo Scientific Nicolet iS50 FT-IR Spectrometer to monitor changes of chemical compounds for 6 months. Each spectrum was collected from 50 scans in the absorbance mode.

Scanning Electron Microscopy/Energy Dispersive X-Ray Spectroscopy (SEM/EDS)

Scanning electron microscopy coupled with energy dispersive X-ray spectroscopy (SEM/EDS) was used to analyze the surface of samples which can change significantly. Because of the charging problem, the samples coated with gold before analyzing. The SEM pictures at two different magnifications (×70 and ×200) were taken.

2.2.7. X-Ray Photoelectron Spectroscopy (XPS)

X-ray photoelectron spectroscopy (XPS) was utilized to analyze the surface of the unaged and aged GM 1 thin. All elements except hydrogen and helium at sample depths of 7-10 nanometers can be detected by using XPS (Rowe R. K. & Sangam R. H., 2008). ULVAC-PHI XPS machine was used for the survey and high-resolution scan analyses which were carried out in the area of 100μ at the energy of 93 and 23 eV, respectively. In addition, to find carbon bonds on the GM surface as a percentage of total carbon can be detected by the high-resolution carbon s1 XPS.

Thermogravimetric Analysis (TGA)

The thermogravimetric analysis (TGA) is a method that measure continuous mass weights with increasing temperature. This method can give useful information to determine the amount of moisture, volatiles, carbon black, ash, chemical compounds, quality of compounds and decomposition temperatures in the sample (Lodi, P. C., & Souza, B. B. D., 2012). Therefore, the thermogravimetric analysis (TGA) is one of the most common methods to determine the quantity of a filler within a polymer. For HDPE GM, the polymer and additives in the inert atmosphere will volatilize at different temperatures until 600° C. and the residual mass is carbon black and ash (Lodi & Souza, 2012).

According to ASTM D6370, the 2-10 mg samples in the aluminum pan holder were heated until 600° C. at a rate of 20° C./min and under nitrogen gas flow of 100 mL/min with using Metier Toledo TGA/DSC 1 machine. The total loss of mass of geomembranes before and after degradation was evaluated and compared. In addition, the temperature ($T_{\%5}$) at which a sample loses 5% of its weight, was used as the onset temperature of thermal decomposition to compare thermal stability.

Results and Discussion

Crystallinity Test with Differential Scanning Calorimetry

The DSC test was performed to find changes in enthalpy ($\Delta H_m$) and crystallinity ($\chi_c$) due to thermal-oxidative degradation. The dotted lines are the baselines, and the area between the curve and the baseline gives the value of enthalpy ($\Delta H_m$) (FIG. 1).

First of all, the crystallinity depends on the resin. The copolymerized alpha olefins with resin can decrease crystallinity by forming short branching because HDPE consists of linear long ($CH_2$) chains (Van Santvoort, 1994). Secondly, the crystallinity also depends on cooling rate, take up ratio during the processing. The high cooling rate decreases crystallinity while high take-up ratio increases crystallinity because of less time for crystallization (Ewais, 2014). In other words, the stress history can affect the crystallization during the processing. Thirdly, during thermal-oxidative degradation, the main active mechanisms which are chain scission (increase in MI) and/or cross-linking (decrease in MI) can affect crystallinity. When the chain scission mechanism is dominant, the crystallinity can increase, and smaller chains can form (Novak et al., 2014). Also, Petermann et al. 1976; Dörner & Lang 1998 (a), (b) stated that the physical aging can increase crystallinity due to the incubation at a higher temperature which results in re- and/or post crystallization of the material from the chain-scission reactions.

Tables 3-5 show enthalpies, peak temperatures which are obtained from the DSC curve and crystallinity. Crystallinity was obtained from equation 1. The crystallinity of unaged samples is around 49% (Table 3). After 3 months of the thermal-oxidation process, the crystallinity increased from around 49% to around 51% for all samples except GM 1 thick (52.7%) (Table 4). In addition, these geomembrane samples have almost same crystallinities even if these geomembranes have different thicknesses and different percentages of antioxidants. Chain scission and recrystallization mechanisms can be responsible for this small crystallinity increase. However, the value of crystallinity slightly decreased after 6 months of aging (Table 5). The crosslinking mechanism might be active as much as chain-scission and re-crystallization mechanisms. In addition, it cannot be seen any big differences in the value of the peak melting temperature.

TABLE 3

Results of Enthalpy, Peak Melting Temperature, and Crystallinity for unaged geomembrane

| Samples | Enthalpy (J/g) | Peak Melting Temperature (° C.) | Crystallinity (Equation 2.1) (%) |
|---|---|---|---|
| GM 1 Thin | 142.34 | 124.83 | 49 |
| GM 1 Thick | 143.37 | 125.68 | 49.4 |
| GM 2 | 142.26 | 126.15 | 49 |
| GM 3 | 142.14 | 125.67 | 49 |
| GM 4 | 142.72 | 125.53 | 49.2 |

TABLE 4

Results of Enthalpy, Peak Melting Temperature, and Crystallinity for 3 months aged geomembrane

| Samples | Enthalpy (J/g) | Peak Melting Temperature (° C.) | Crystallinity (Equation 2.1) (%) |
|---|---|---|---|
| GM 1 Thin | 148.08 | 125.60 | 51 |
| GM 1 Thick | 153.20 | 126.45 | 52.7 |
| GM 2 | 148.99 | 125.85 | 51.3 |
| GM 3 | 148.82 | 127.30 | 51.3 |
| GM 4 | 147.64 | 125.76 | 50.9 |

TABLE 5

Results of Enthalpy, Peak Melting Temperature, and Crystallinity for 6 months aged geomembrane

| Samples | Enthalpy (J/g) | Peak Melting Temperature (° C.) | Crystallinity (Equation 2.1) (%) |
|---|---|---|---|
| GM 1 Thin | 148.10 | 125.62 | 51 |
| GM 1 Thick | 144.98 | 125.12 | 49.9 |

TABLE 5-continued

Results of Enthalpy, Peak Melting Temperature, and
Crystallinity for 6 months aged geomembrane

| Samples | Enthalpy (J/g) | Peak Melting Temperature (° C.) | Crystallinity (Equation 2.1) (%) |
|---|---|---|---|
| GM 2 | 145.81 | 127.71 | 50.2 |
| GM 3 | 146.91 | 126.35 | 50.6 |
| GM 4 | 148.96 | 126.33 | 51.3 |

Tensile Test

Figures 2A, 2B:
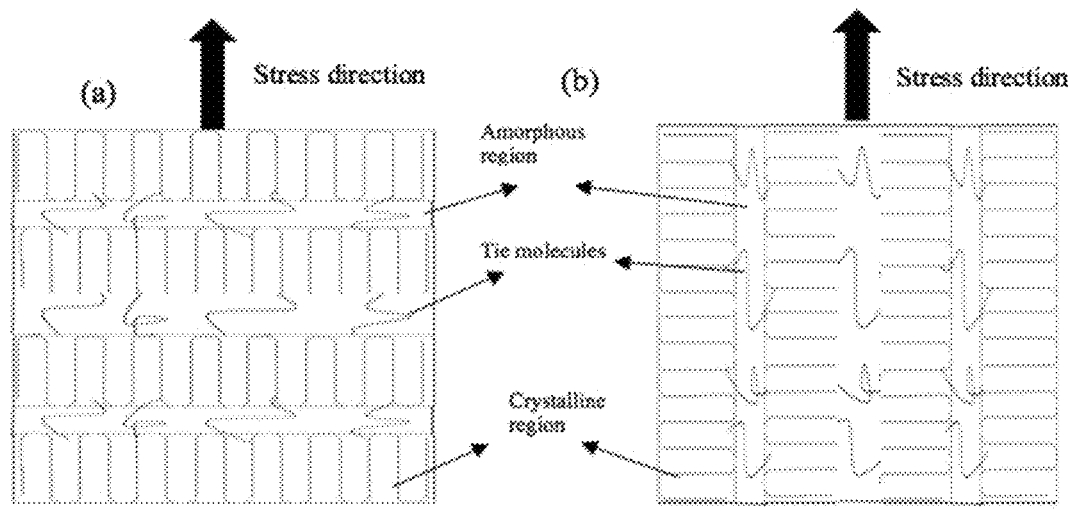
FIGS. 2A-2B show (a) applying stress in the machine direction and (b) applying stress in the cross-section direction.

The tensile test was performed to find changes of elongation and stress at yield and break for unaged and aged GM 1 sample. For unaged samples, the stresses and elongation at yield at the cross-machine direction and machine direction have similar values while elongation at the break at cross-machine direction (850%) is much higher than that of machine direction (692%) (Table 3.3). A similar response for both directions can be due to equal crystal orientation (Lu et al., 2001). However, some studies showed that the values of the stresses and elongations at yield and break at cross-machine direction and machine direction are different (Ewais, 2014; Lu et al., 2011; Krishnaswamy & Sukhadia, 2000). The reason can be uniaxial orientation of crystalline lamella. If the crystal orientation is formed perpendicular to machine direction, the soft amorphous phase can be dominant to determine properties of tensile test during applying stress in the machine direction (FIG. 2A). Also, the first possible deformation can be the lamellar separation which is limited by the presence of tie molecules in the polymer until yield. After yield, the main deformation mode is chain slip for crystalline phase (Lu et al., 2001). When the stress applies in the cross-section direction, the hard crystal phase can be dominant to determine properties of tensile test (FIG. 2B). In addition, lamellar separation, interlamellar shear and lamellar rotation which can be formed in the amorphous phase, can affect very little or no (Krishnaswamy & Sukhadia, 2000; Lu et al., 2001). The main mechanisms for crystalline phase are "the break-up of the crystalline lamellae, the pull-out of the chains from the lamella and the transverse slip" (Lu et al., 2001), are dominant in the cross-machine direction. Therefore, the break stress in the cross-machine direction is lower than that of in the machine direction because strain hardening, which is strengthening in the amorphous phase during the large strain deformation, cannot be formed or formed a little in the cross-machine direction. In addition, the film in the cross-machine direction can yield very small compared with the film in the machine direction (Lu et al., 2001). On the other hand, if the crystalline lamella perpendicular to cross-machine direction, the film in the machine direction can yield very small compared with the film in the cross-machine direction.

In addition, the value of stress at yield and break for GM 1 thin is 16.8 MPa and 30.6 MPa for machine direction and 17.47 MPa and 30.38 MPa for cross-machine direction, respectively. These values of stress at yield and break are higher than literature for 0.5 mm HDPE and the values of similar to 1 mm thickness of HDPE geomembrane (Ewais, 2014; Ewais &Rowe, 2014; Rowe et al., 2010). The main reason can be smaller carbon black size, different antioxidants and production methods. Especially, smaller carbon black size can increase strength.

After 3 months of aging, the value of the elongation and stress at yield and break at both directions increased around 10%. The increasing strength may be due to increasing crosslinking/chain branching during the especially early stage of aging. (Wong, 2014). The stress and elongation at break at cross-machine direction are also higher than that of machine direction after 3 months (Table 3.4). The differences in the lamella orientation between the cross-machine direction and machine direction can cause different properties in terms of elongation and stress. (Ewais 2014).

After 6 months aging, especially stress at the break at cross-section direction unexpectedly decreased to 22.22 MPa while the stress at break at machine direction decreased around 10%. This unexpected decrease can be because of heterogenous oxidation or agglomeration. As stated above, HDPE geomembrane consists of amorphous and crystalline phases and the oxidation reaction is mainly into the amorphous phase because oxygen cannot easily diffuse the crystalline phase. Therefore, heterogenous oxidation can cause slight fluctuations for the result of tensile tests (Grassie and Scottt, 1985 as cited in Wong 2011). In addition, another reason can be the agglomeration because the agglomeration of small size of carbon black can particularly occur in the polymer and this agglomeration can cause untimely (early) failure (Wong, 2011). Also, the elongation at yield for both directions decreased while the elongation at break for both directions increased. The values of elongation at breaks looks not stable, the reason can be crosslinking/branching during the degradation (Wong, 2011) because the mobility of polymer chain in the amorphous phase can be decreased by crosslinking reactions. This decreasing mobility cannot blunt sharp fatigue crack which is easy to propagate (Ries & Pruitt, 2005) That is to say, if there is any small crack, less energy is enough to propagate crack.

Wong W. K., (2011) explained that "The strength of polyethylene mainly correlates to the chain drawing of entanglement networks". In addition, the oxidation reaction can affect the changing molecular weight via chain scission and/or crosslinking and changing molecular weight can significantly affect elongation. Therefore, it can be said that the tensile test can be an indicator of oxidation.

Figures 3A, 3B:
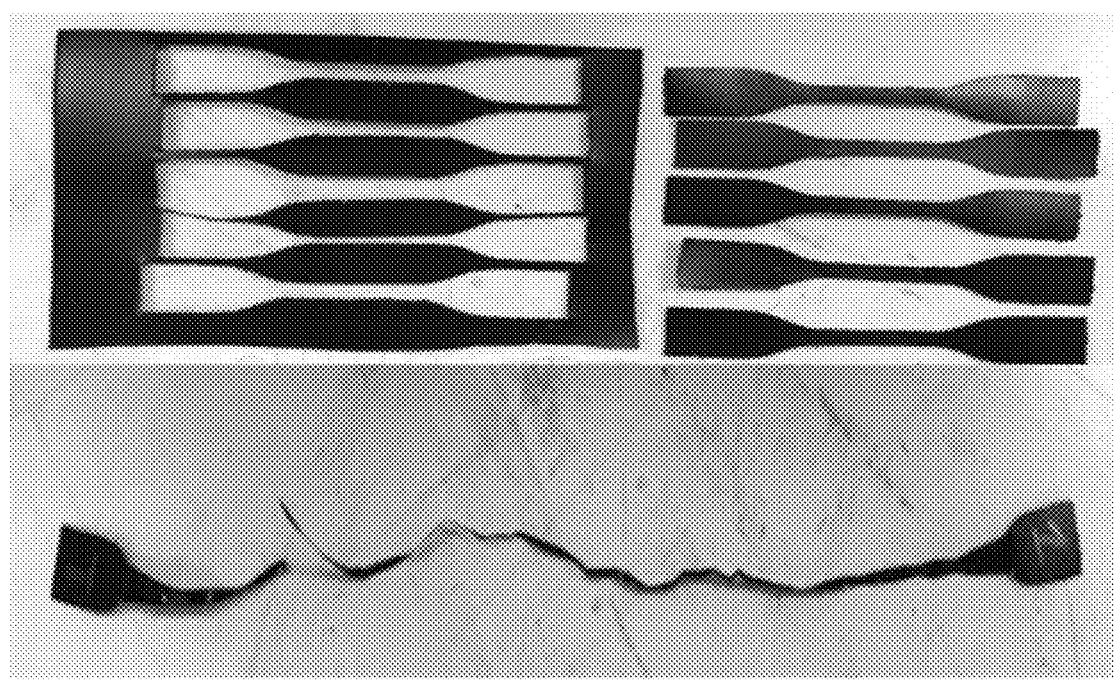
FIGS. 3A-3B show (a) the shape of the geomembrane samples before tensile tests and (b) the geomembrane sample after the break.

FIGS. 3A and 3B show the geomembrane samples before tensile tests and after the break. FIG. 3A shows that the material was cut as a shape of a dog bone structure before the tensile test. After running the experiment, it can be easily seen the elongation of geomembrane.

TABLE 6

The tensile results of unaged and aged GM 1 thin samples

| Tensile Properties (ASTM D6693) | Sample 1 | 3 months aged | 6 months aged |
|---|---|---|---|
| Stress at a yield at a machine direction | 2436.5 PSI<br>16.8 MPa | 2647.5 PSI<br>18.25 MPa | 2403.3 PSI<br>16.57 MPa |
| Elongation at yield at machine direction | 10.9 (%) | 12.0 (%) | 11.5 (%) |
| Stress at the break at machine direction | 4439.3 PSI<br>30.6 MPa | 4487.1 PSI<br>30.94 MPa | 3738.63 PSI<br>25.77 MPa |
| Elongation at break at machine direction | 692.6 (%) | 804 (%) | 895.38 (%) |
| Modulus at machine direction | 93444.7 PSI | 52990.3 PSI | 47827 PSI |
| Stress at yield at the cross-machine direction | 2533.4 PSI<br>17.47 MPa | 2741.6 PSI<br>18.9 MPa | 2470 PSI |
| Elongation at yield at cross-machine direction | 10.3% | 13.1% | 8.2% |

TABLE 6-continued

The tensile results of unaged and aged GM 1 thin samples

| Tensile Properties (ASTM D6693) | Sample 1 | 3 months aged | 6 months aged |
|---|---|---|---|
| Stress at break at cross-machine direction | 4406.9 PSI 30.3830 MPa | 5003.1 PSI 34.49 MPa | 3223.4 PSI 22.22 MPa |
| Elongation at break at cross-machine direction | 850 (%) | 910.3 (%) | 752 (%) |
| Modulus at cross-machine direction | 109773 PSI | 58822.7 PSI | 91523 PSI |

Melt Index Test

Melt index values provide information on molar mass related phenomena. MFI is a measure of the ability of the material to flow under pressure and relates to melt viscosity. The MFI has an inverse relationship to melt viscosity under the conditions on the test. The viscosity measurement is dependent on the applied force. An increase in the MFI indicates a decrease in the molar mass (due to chain scission reaction) and in the viscosity and hence the material flows easier. In the same way, a decrease in MFI can signify that crosslinking has occurred. The MI value is 0.17 g/10 mi for unaged and aged samples. During the twelve weeks of aging, there was no change for the MI value of HDPE geomembranes.

In the geomembrane, 0.05% Irfagos® 168 was used to protect properties during the processing. This percentage can also be enough to help GM to maintain initial properties value of melt flow index test because the values did not change after 12 weeks of aging.

Fourier Transform Infrared (FTIR)

The peaks for all unaged geomembranes are at around 2914 to 2847, 1472 to 1462, and 729 to 718 which are related to anti-symmetric and symmetric stretching vibration, scissor vibration, and rocking modes of the $CH_2$ structures. After aging, the outputs for polyethylene are the carbonyl compounds such as ketones, aldehydes, carboxylic acids, esters in the range of 1630 and 1750 $cm^{-1}$ (Wong, 2011, pp. 126). To elucidate the oxidation degradation on the surface of geomembranes, FTIR was utilized to detect the existence of carbonyl compounds. The absorption peak of 1735 $cm^{-1}$ with C=O stretching and additional peaks of 1252, 1227, 1199, 1120, 1100 1021 945 $cm^{-1}$ with C—O were formed for all geomembrane's surface.

In addition, to evaluate the extent of oxidation for all samples, the carbonyl index (I) calculated from using equation 2. These carbonyl index values from 0 to 180 days are indicated in Table 7. It can be seen that as incubation time increases, the value of the carbonyl index increases. In addition, after 180 days (6 months) incubation, the value of the carbonyl index (I) increased from 0.0384 to 0.382 for GM 1 thick; 0.0384 to 0.214 for GM 1 thin; 0.0398 to 0.392 for GM 2; 0.0851 to 0.455 for GM 3; 0.0515 to 0.535 for GM 4. According to these results, the extent of the oxidation is the lowest for thin GM 1 even if the others are thicker and/or have more antioxidants. The reason can be the quality of mixing of additives and the pressure and temperature and before and during the processing, respectively.

TABLE 7

The values of the carbonyl index (I) for all geomembranes

| Samples/ Time (days) | 0 | 45 | 60 | 90 | 135 | 180 |
|---|---|---|---|---|---|---|
| GM 1 thick | 0.038 | 0.146 | 0.211 | 0.189 | 0.334 | 0.382 |
| GM 1 thin | 0.038 | 0.084 | 0.126 | 0.139 | 0.182 | 0.217 |
| GM 2 | 0.039 | 0.148 | 0.147 | 0.248 | 0.340 | 0.392 |
| GM 3 | 0.085 | 0.3639 | 0.357 | 0.432 | 0.436 | 0.455 |
| GM 4 | 0.051 | 0.1693 | 0.316 | 0.320 | 0.457 | 0.535 |

Figure 4:
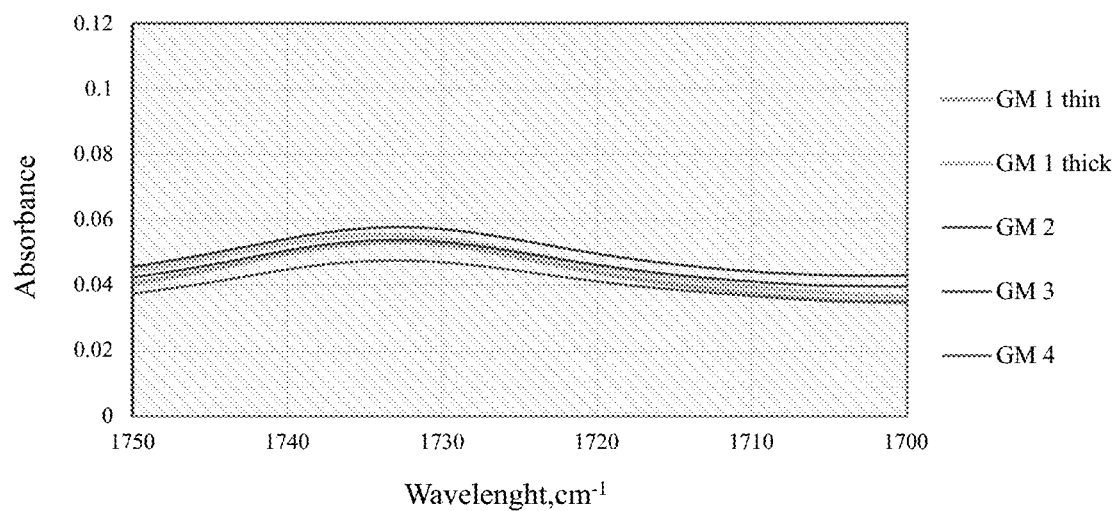
FIG. 4 shows the absorption peaks of 1732 $cm^{-1}$ for 6 months aged geomembranes.

Though the values of the carbonyl index have big differences, there are no noticeable differences in terms of the value of the peak intensities of 1732 cm-1 for 6 months aged geomembranes (FIG. 4). In addition, the value of the peak intensities of 2850 cm-1 for unaged and 6 months aged (FIGS. 5A and 5B) geomembranes are very different. The value of the absorbance peak of a methylene group (—$CH_2$—), symmetric stretching vibration decreased after 6 months. The value of 2850 cm-1 bond decreased from 0.40 to 0.24 for GM 1 thin; from 0.31 to 0.14 for GM 1 thick; from 0.42 to 0.15 for GM 2; from 0.23 to 0.11 for GM 3; from 0.35 to 0.09 for GM 4. In other words, GM 1 thin still has a high peak intensity of 2850 $cm^{-1}$ bond.

Figures 5A, 5B:
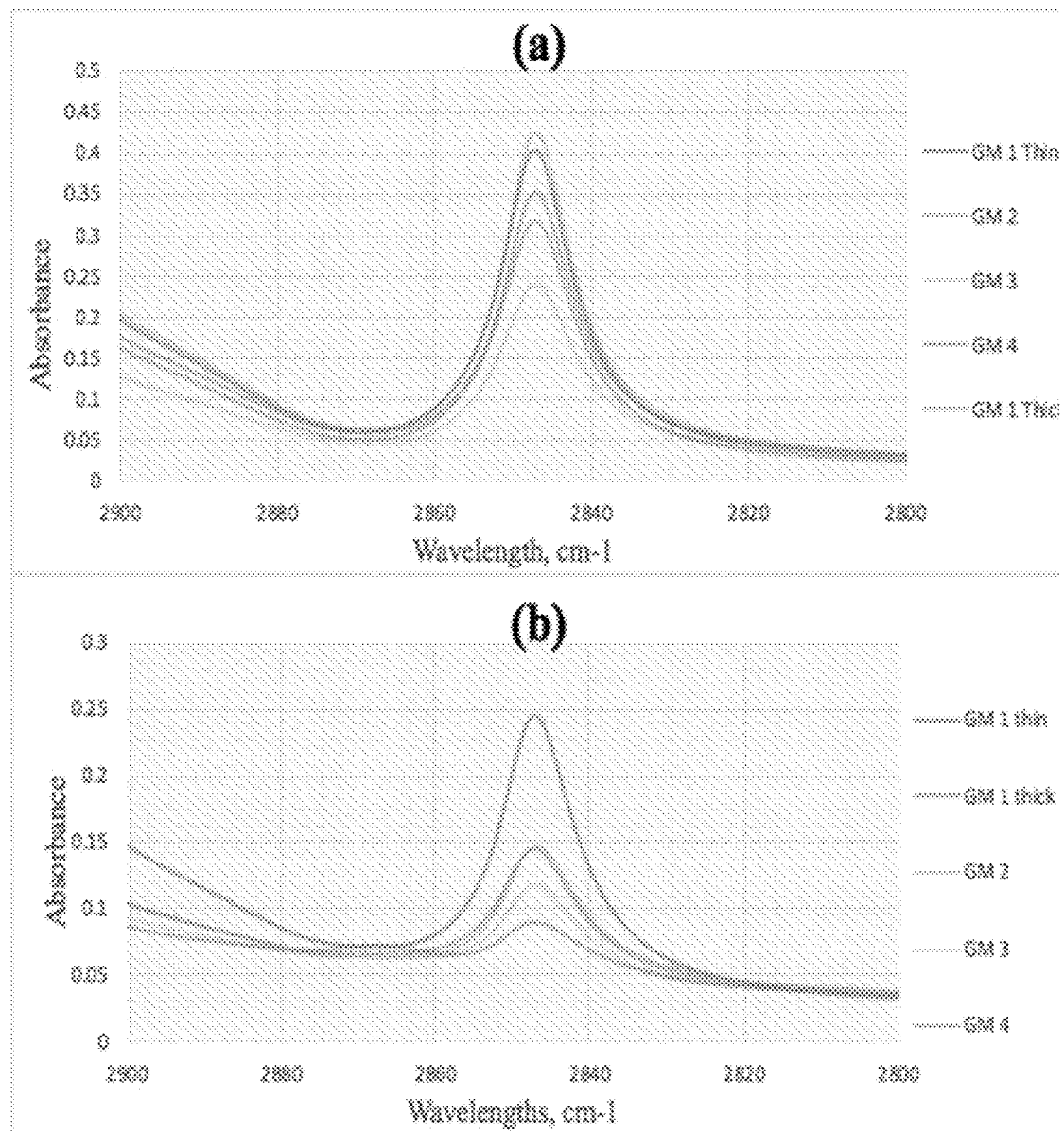
FIGS. 5A-5B show the peak intensities of 1732 $cm^{-1}$ for (a) unaged samples (b) 6 months aged samples.
Figure 6:
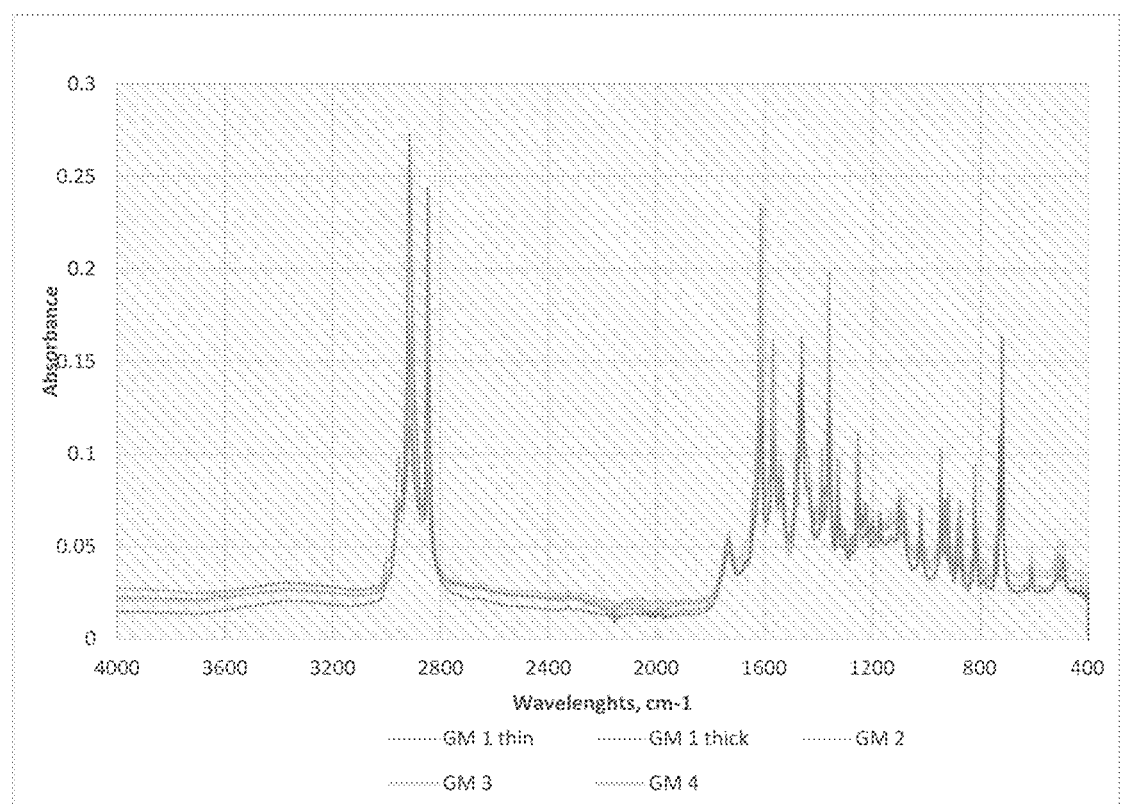
FIG. 6 shows the absorbance of the geomembranes after 6 months.

FIG. 4, and FIGS. 5A and 5B show that there are small differences for the values of the peak intensities of 1732 cm-1 (C=O) while the peak values of 2850 cm-1 ($CH_2$) for all geomembranes are distinctive because phenolic antioxidants, HALS and carbon black can interact with each other. These can cause to form other bonds. These other bonds which are C—N (1538, 1021 $cm^{-1}$), C=N (1567, 1327 $cm^{-1}$), N=N (1613 $cm^{-1}$), C—C(1567, 1388, 1170, 917 $cm^{-1}$), C=C (1613, 1483 $cm^{-1}$), C—H (1388, 1360, 1021, 917, 874, 744, 610 $cm^{-1}$), C—O—C(1084, 820 $cm^{-1}$), C—COOH (1084 $cm^{-1}$), CHs (2955 $cm^{-1}$) and $CH_2$ (1483, 1456, 1360, 1199, 945 $cm^{-1}$) were seen with using the FTIR (FIG. 6) and these bonds values, assignments and references are given in Table 8.

In addition, among these all peaks, it can be seen that three prominent peaks which are 1613, 1567 and 1360 $cm^{-1}$ were formed after 6 months of aging. Moreover, the absorbance peak of 1613 cm-1 can be C=C (Ghimire et al., 2019; Medina et al., 2017; Sun et al., 2017), C=O (Abnoos et al., 2018; Kailasan et al., 2010); the absorbance peak of 1567 cm-1 can be carboxylate groups, O=C—O— (Mitra et al., 2006), C=C (Medupin et al., 2017; Sun et al., 2017) or N—H (Yamina et al., 2018), carbonyl groups of COO— anion (Moini et al., 2019); the absorbance peak of 1360 cm-1 can be CH2 wagging mode (Ye et al., 2013), C—H deformation mode (Surov et al., 2018). These prominent and other peaks which are mostly formed with carbon bonds can be formed after interaction between carbon black and antioxidants. The antioxidants tend to react with carbon surface instead of free radicals because the surface of carbon black is a strong acceptor (Wong W & Hsuan G. Y., 2014). Although the low adsorption potential of Irganox® 1330 onto carbon black (Scheirs 2009), the negative interactions were seen with an especially higher concentrations of antioxidants. Therefore, the lower performance can be expected for especially GM 3 and GM 4 because of higher concentrations of phenolic antioxidants and HALS, respectively.

TABLE 8

FTIR peaks values, possible assignments and references

| Wavenumber (cm$^{-1}$) | Structure | References | Wavenumber (cm$^{-1}$) | Structure | References |
|---|---|---|---|---|---|
| 2955 | CH$_3$ asymmetric vibrations | Morent et al., (2008) | 1100 | C—O stretching | Gregório, I., Zapata, F., & García-Ruiz, C. (2017). |
| 1613 | C=C stretching vibrations | Ghimire et al., 2019. | 1084 | νC—COOH C—O (COO)stretching, | Lefèvre, G., Preočanin, T., & Lützenkirchen, J. (2012) Trivedi et al., (2015). |
| 1567 | carboxy-late groups, O=C—O— C=C aromatic symmetrical stretching bond NH bending vibrations carbonyl groups of COO—anion | Mitra et al., 2006. Medupin et al., 2017 Yamina et al., 2018 Moini et al., 2019 | 1021 | C—O stretching vibration | Cornet, I., Wittner, N., Tofani, G., & Tavernier, S. (2018). |
| 1538 | —COO— asymmetric stretching | Doménech-Carbó et al., 2019 | 945 | C—O stretching C—H | Drozd, et al., (2017). Bykov, I. (2008). |
| 1483 | CH$_2$ scissoring C=C | Rajendran, S., Mahendran, O., & Kannan, R. (2002) Shen et al., (2015). | 929 | —CO stretching C—C stretching γC—H γ(CH2) Out of Plane Bending | Pang, S. F., Wu, C. Q., Zhang, Q. N., & Zhang, Y. H. (2015) Lou, et al., 2014). Olsztynska, S., & Komorowska, M. (2011). |
| 1456 | CH2 bend | Bouyanfif et al., (2019). | 917 | C—C stretching, out of plane bending mode of C—H | Delgado-Mellado, et al., (2018). Liang, Y., Zheng, M., Park, K. H., & Lee, H. S. (2008). |
| 1388 | C—C inter-ring stretching C—H bending bands | Diilikov, S. K. & Koenig, J. L. (1979) | 885 | γ(=C—H) out of plane aromatic ν(C—COOH) δ(OH) | Farnet-Da Silva, et al., (2017). Yang, et al., (2020). Liu, et al., (2013). |
| 1360 | CH$_2$ wagging C—H deformation mode | Ye et al., (2013) Surov et al., (2018) | 874 | —CH out of plane blending CH2 wagging | Cole, et al., (2019). Hua, H., & Dubé, M. A. (2001). |
| 1327 | δ (C—H) C—O C=N | Pfaffeneder-Kmen et al., (2017). Liu et al., (2006) | 820 | C—O—C in-plane Bending Nitrate N—O stretching | Devi, K. R., & Madivanane, R. (2012) Mishra, et al., (2016). |
| 1252 | C—O—C asymmetric stretching mode | Zieba-Palus, J. (2017). | 744 | CH bend (out-of-plane) CH2 rocking | Sanches, N. B., Cassu, S. N., & Dutra, R. D. C. L. (2015). Gorassini, A., Adami, G., Calvini, P., & Giacomello, A. (2016) |
| 1227 | C—O (eter) stretching CH2 wagging mode | Erwanto et al., (2016). Kumari et al., (2008). | 610 | C—C—N bending mode O—H bending | Heredia, et al., (2017). Tamilselvi, et al., (2019). |
| 1199 | CH2 bond C—O stretching | Jung et al. (2018) Ghorpade, et al., (2019) | 508 | CC skeletal bending | Bolbasov, et al., (2014). |
| 1170 | C—O asymmetric stretching δ (C—H) | Mui, G., Hamminga, G. M., & Moulijn, J. A. (2004). Urbaniak-Domagala, W. (2012). | 492 | C—N—C deformation C—C=C bending | Rekha, P. S., & Gunasekaran, S. (2018). |
| 1120 | C—O stretching NH bending | Lewis et al., (2010) Abbasian, A., & Ekbatani, S. (2019). | | | |

Scanning Electron Microscopy (SEM)

Figures 7A, 7B, 7C:
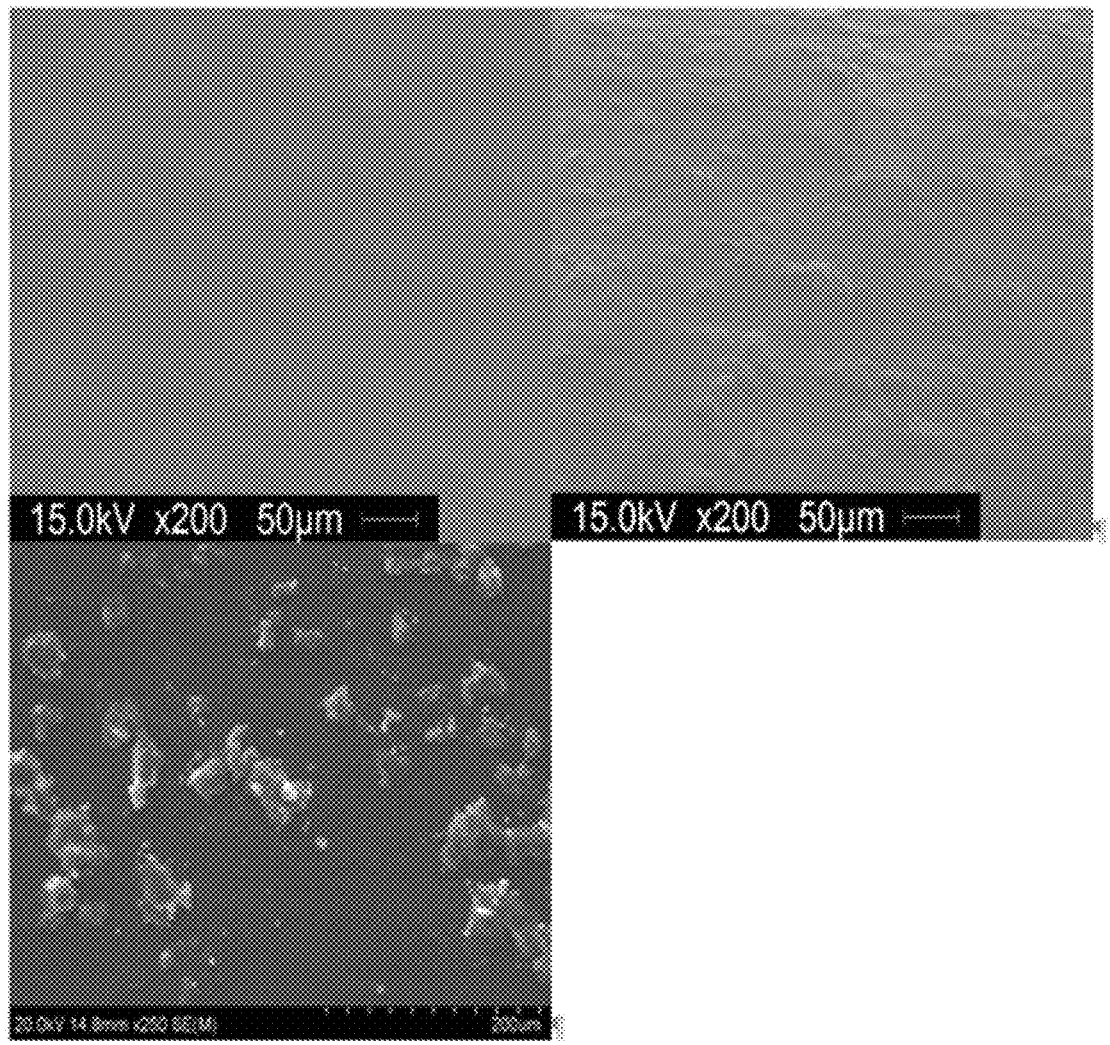
FIGS. 7A-7C show (a) GM surface for unaged sample, (b) GM surface after 6 months aging, and (c) the particles on the GM surface.

The SEM images (FIG. 7) show the surface of unaged and aged geomembranes. The surface of the unaged geomembrane is quite smooth while the roughness increased after 6 months. In addition, the machine direction and cross-machine direction during the extrusion can be understandable for both unaged and aged samples. Also, some fine particles were observed on the surface of geomembranes after 3 months of degradation. It is expected that the percentage of Irganox® 1330 (low molecular weight phenolic antioxidant) exceeded the solubility limit of the polymer. Therefore, the super-saturated condition gives rise to blooming and phase separation on the GM surface (Wong, 2014).

Tables 9 and 10 show the EDS result of geomembranes. Mostly carbon and oxygen atoms were detected, and the gold element was also detected around 0.2 wt. % because of gold coating for geomembranes before SEM and EDS. It is predicted and seen that the oxygen percentage increased after aging.

TABLE 9

Surface compositions of the surface of unaged geomembranes with EDS

| | Percentage of elements | |
|---|---|---|
| The sample | Carbon (wt %) | Oxygen (wt %) |
| GM 1 Thin | 98.85 | 1.15 |
| GM 1 Thick | 96.92 | 3.08 |
| GM 2 | 97.12 | 2.28 |
| GM 3 | 95.68 | 4.32 |
| GM 4 | 93.4 | 6.6 |

TABLE 10

Surface compositions of the surface of 6 months aged geomembranes with EDS

| | Percentage of | elements |
|---|---|---|
| The sample | Carbon (wt %) | Oxygen (wt %) |
| GM 1 Thin | 91.77 | 8.23 |
| GM 1 Thick | 89.61 | 10.39 |
| GM 2 | 91.20 | 8.80 |
| GM 3 | 88.61 | 11.39 |
| GM 4 | 89.21 | 10.79 |

X-Ray Photoelectron Spectroscopy (XPS)

Figures 8A, 8B:
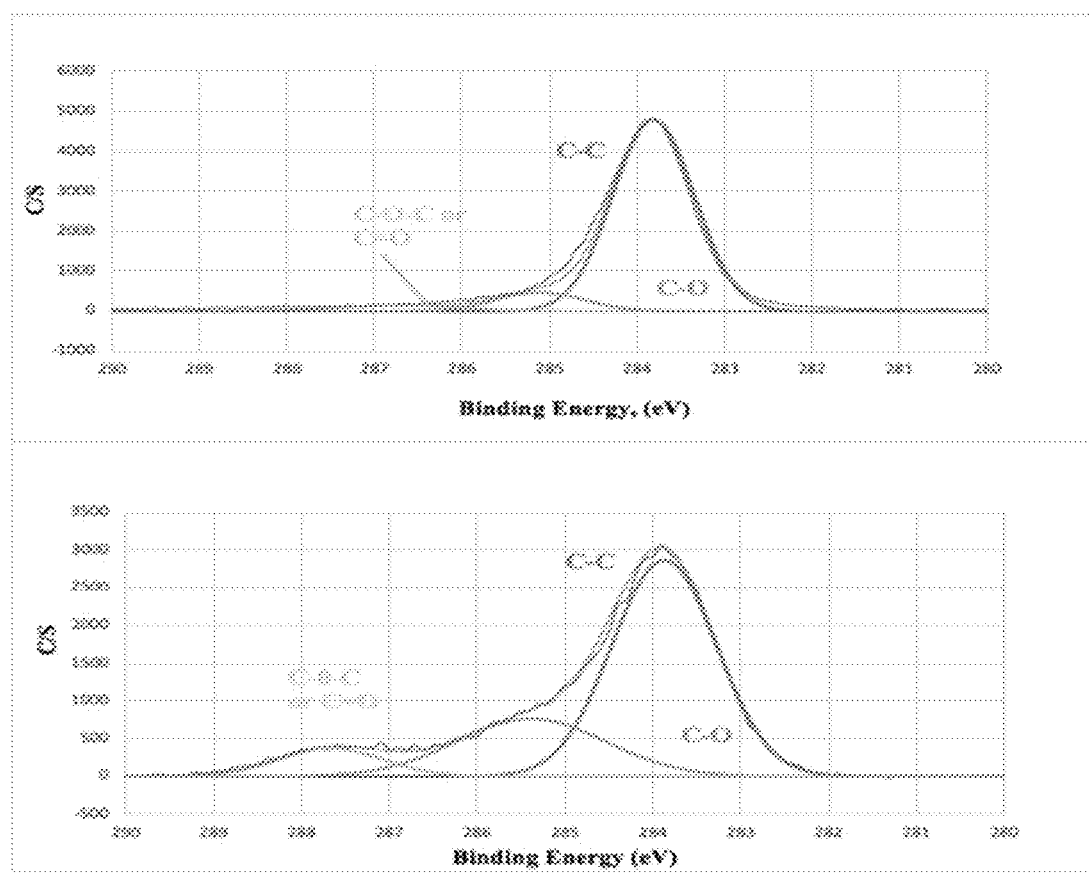
FIGS. 8A-8B show C1s XPS spectra of the GM 1 thin (a) before and (b) after thermal aging at 85° C. in air for 6 months.

The high-resolution carbon s1 XPS was performed to measure the percentage of C—C, C—O—C and O—C=O bonds on the surface of geomembrane. a mixture of a Gaussian and a Lorentzian and Shirley method are used to fit C 1s peaks for polymer Marcondes et al., (2004). The binding energy of 284.4 eV, 285.6 eV and 287.8 eV can be attributed to C—C, C—O and C=O or C—O—C chemical bonds on the surface of the GM 1 thin, respectively (FIGS. 8A and 8B) (Hamzah et al., 2018). According to the figures, the increasing C—O and C=O or O—C—O bonds can be seen easily.

The area ratio of the peaks can give information about the percentage of carbon bonds on the surface. Therefore, XPS can be at least semi-quantitative analysis (Desimoni & Brunetti, 2015). Table 11 shows that single or double bonds between carbon and oxygen on the surface of geomembrane increased significantly due to the degradation.

TABLE 11

The approximate results of high-resolution carbon 1 s XPS analyses (%)

| Samples | C—C (%) | C—O (%) | C=O or O—C—O (%) |
|---|---|---|---|
| Unaged GM 1 thin | 85.8 | 9.4 | 4.8 |
| 6 months aged GM 1 thin | 67 | 24.3 | 8.7 |

Thermogravimetric Analysis (TGA)

This work presents results from TGA tests conducted in HDPE geomembranes after aging in order to assess the degradation process concerning the total mass loss of geomembranes. Table 12 shows polymer, residual mass and onset temperatures for unaged and 6-months aged geomembranes. The polymer and residual mass were obtained by the software of TGA. After 6 months of the aging period, it can be clearly seen that the percentage of residual mass decreased. The decreasing residual mass can be due to forming volatile fragments such as carbonyl groups because of thermal-oxidative degradation (Tisinger, L. G. & Carraher C. E., 1990). According to Lodi and Bueno (2012), fresh HDPE geomembrane (0.8 and 2.5 mm) and HDPE geomembranes (0.8 and 2.5 mm) that exposed to 30 months of weathering and leachate showed the similar value of the residual mass (carbon black) between 0.08 and 1.72%. These values for geomembranes are quite lower than ASTM standards.

TABLE 12

TGA results for unaged and aged geomembranes

| Unaged Geomembranes | Polymer (%) | Residual mass (%) | Onset Temp. (° C.) | 6 months aged Geomembranes | Polymer (%) | Residual mass (%) | Onset (° C.) Temp. |
|---|---|---|---|---|---|---|---|
| GM 1 thin | 96.5898 | 3.41 | 436 | GM 1 thin | 97.2384 | 2.77 | 411 |
| GM 1 thick | 96.7157 | 3.29 | 432 | GM 1 thick | 97.27 | 2.73 | 437 |
| GM 2 | 96.5088 | 3.5 | 421 | GM 2 | 97.40 | 2.6 | 435 |
| GM 3 | 94.4896 | 5.52 | 430 | GM 3 | 96.782 | 3.22 | 440 |
| GM 4 | 96.8937 | 3.11 | 420 | GM 4 | 97.4884 | 2.52 | 439 |

In addition, the onset (initial degradation) temperatures ($T_{5\%}$) for all unaged geomembranes are lower than that of 6-months aged geomembranes. The Table 12 and FIGS. 9 and 10 show that the range of onset temperatures after 6 months aging increased between 5° C. and 20° C. while Lodi & Bueno (2002) measured that the initial degradation temperature for unaged HDPE geomembranes (0.8 mm) is around 420° C. and this value increased to 440 and 480° C. after 30 months weathering and under the leachate. The increasing initial degradation temperatures for 6 months aged geomembranes are less than that of 30 months exposed geomembranes because of different materials, long time period and the different aging processes. During the thermal-oxidative aging, decomposition, crosslinking and generation of low molecular volatile products can be occurred in the polymer (Muller W. 2007). Especially, "the beginning of the oxidation, branching and crosslinking of the long polymer chains dominate." (Muller W. 2007, pp. 155). Therefore, the onset temperatures for aged geomembranes can be higher than that of unaged geomembranes. Also, it can be said that the thermal oxidative aging provided better thermal stability (Zhang et al., 2017).

Figures 9A, 9B:
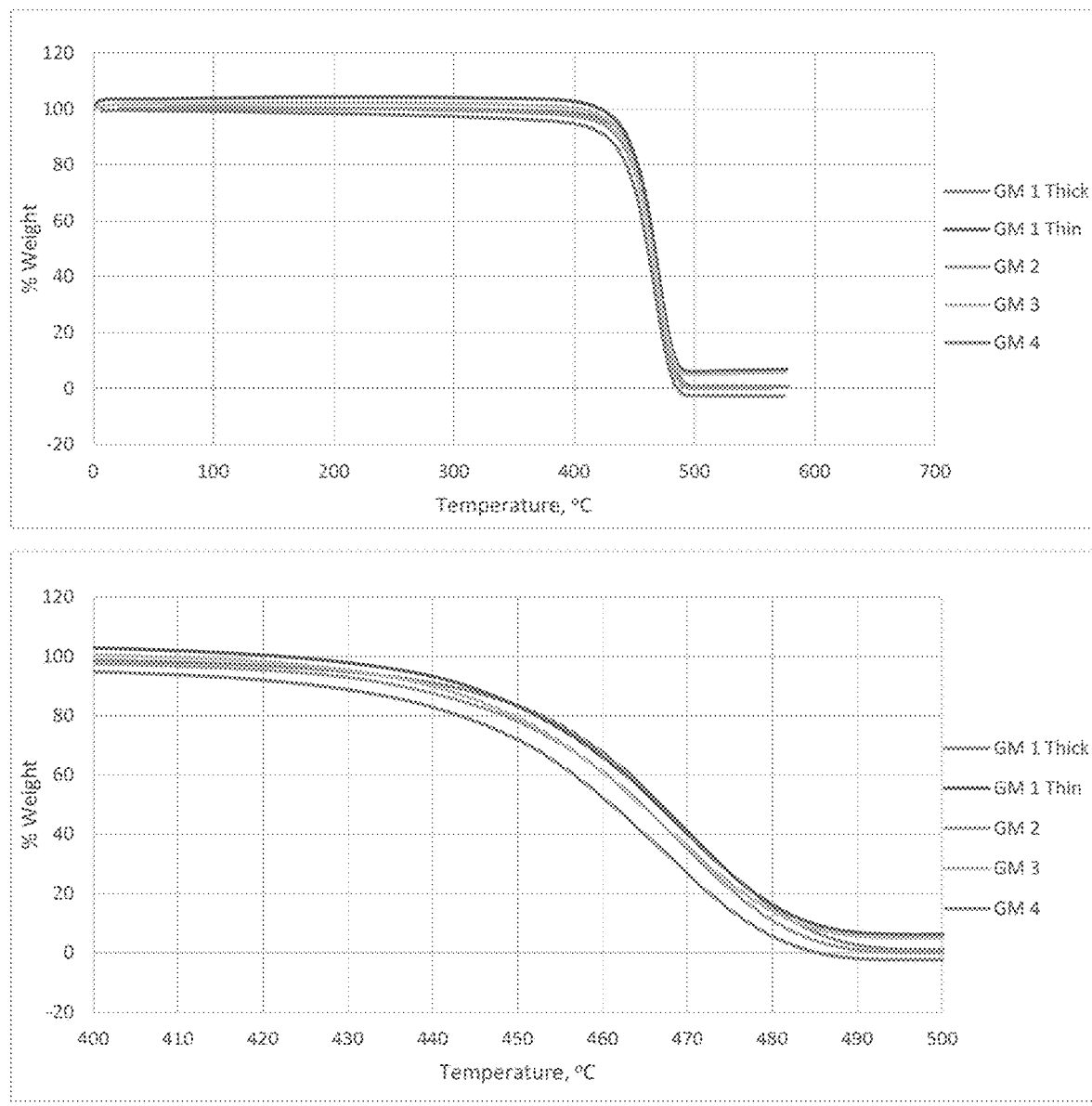
FIGS. 9A-9B show TGA results for unaged geomembranes (a) at a temperature between 0° C. and 600° C. (b) at a temperature between 400° C. to 500° C.
Figures 10A, 10B:
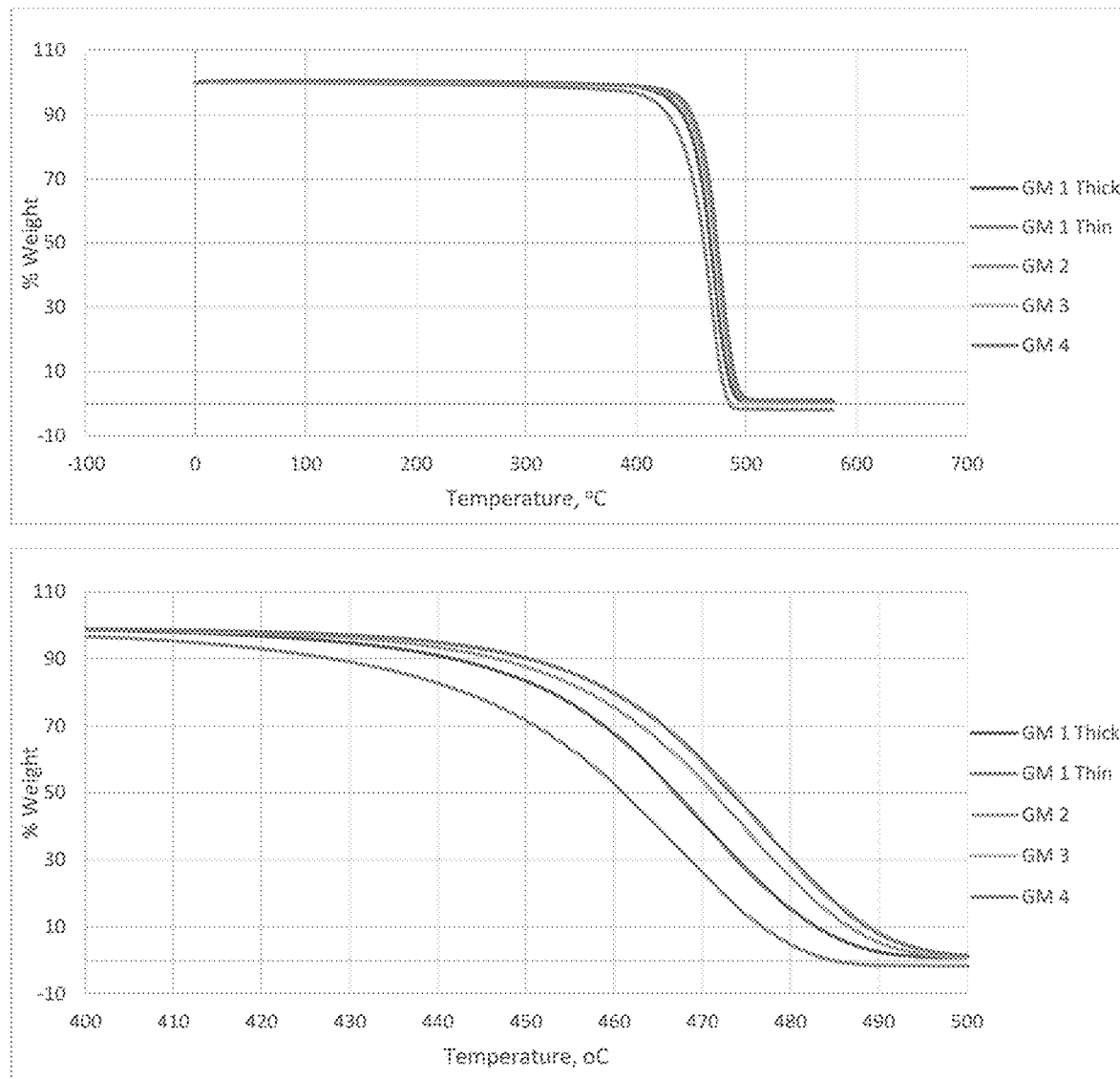
FIGS. 10A-10B show TGA results for aged geomembranes (a) at a temperature between 0° C. and 600° C. (b) at a temperature between 400° C. to 500° C.

FIGS. 9B and 10B show TGA results between the temperature of 400 and 500° C. to clearly see onset temperatures and decomposition for unaged and aged geomembranes, respectively. In addition, there are not seen any significant differences between unaged geomembranes. In addition, for aged geomembranes, the maximum difference of onset temperatures is only 5° C.

Although all geomembranes were produced with the same percentage of carbon black, the percentage of residual mass (carbon black and ash) is not the same for unaged geomembranes. the reason can be the amount of ash or agglomeration because the mixing small size of carbon black is very difficult and carbon black can agglomerate with other carbon black molecules. Therefore, the agglomeration can cause an ununiform structure in the geomembrane.

CONCLUSION

The chemical, physical and mechanical properties for several geomembranes were evaluated after manufacturing and during/after 6 months of aging. There are five geomembranes; two of them have the same compositions but the different thicknesses and three of them have different compositions.

The geomembranes were produced with the same percentages of carbon black and hindered phosphite with different percentages of phenolic antioxidants and HALS for all geomembranes. During processing, the take up ratio and stress histories can affect properties of geomembranes. In addition, the different percentages of phenolic antioxidants and HALS interacted with carbon black in the geomembranes during degradation. According to results of experiments, the properties of geomembranes after processing and during and after 6 months were evaluated.

The crystallinities increased from about 49% to around 51% for different thicknesses and compositions of geomembranes. No significant differences were observed after manufacturing with only small differences after degradation. The dominant mechanisms are recrystallization at elevated temperature and chain scission after 3 months of thermal-oxidative degradation. However, crystallinity decreased slightly after 6 months of degradation. The dominant mechanism might change to cross-linking after 3 months. However, it is important to note that all of the chain-scission, crosslinking and recrystallization are active during the thermal-oxidative degradation.

Melt index values of geomembranes were unaffected by thickness and stress and thermal histories during manufacturing and 3 months of aging because of enough percentage of hindered phosphite. Even though the melt index value did not change, the yield and break strengths increased about 10% for GM 1 thin after 3 months of aging. The increased strength can be due to the cross-linking reaction, but the elongation also increased. However, the value of the tensile test for GM 1 thin dropped sharply and early failure was seen after 6 months of aging due to possible agglomeration and small crack because of the small size of carbon black and increasing crosslinking mechanism.

The carbonyl index number after manufacturing was the same for the same compositions and different thickness but the value of the carbonyl index for GM3 and GM4 were higher than others. The carbonyl value of GM 4 was still higher than other geomembranes because of the high concentration of phenolic antioxidants and HALS while GM 1 thin had the lowest carbonyl index value after 6 months of degradation. In addition, it can be seen that the interactions of the carbon black, HALS and phenolic antioxidants had negative effects between each other.

After 6 months of aging, the surface of the geomembranes showed no differences. However, blooming was seen after 3 months of aging due to increased crystallinity, which can reduce the solubility limit where a majority of antioxidants can exceed the solubility limit. Additionally, low molecular weight antioxidants can diffuse easily from the center to the surface of the geomembrane.

The onset temperature for geomembranes increased after aging and it can start to degrade later than unaged geomembranes. That is to say, the thermal stability increased after aging. Additionally, after aging, the percentage of residual mass is different due to the formation of carbonyl groups and some volatile groups from oxidative degradation and the negative interactions between carbon black, phenolic antioxidants, and HALS.

The interactions between small carbon black, antioxidants and HALS provided high strength and elongation while these interactions can form some additional volatilize compounds and increase the carbonyl index and the number of carbon-oxygen bonds.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

Abbasian, A., & Ekbatani, S. (2019). Resin migration tracking via real-time monitoring FTIR-ATR in a self-stratifying system. Progress in Organic Coatings, 131, 159-164.

ASTM, D. 4439. Standard Terminology for Geosynthetics. The American Society for Testing and Materials. West Conshohoken, Pa. Koerner, Robert M. Designing with Geosynthetics—6Th Edition; Vol2 (Kindle Locations 249-251). Kindle Edition.

Beißmann, S., Reisinger, M., Grabmayer, K., Wallner, G., Nitsche, D., & Buchberger, W. (2014). Analytical evaluation of the performance of stabilization systems for polyolefinic materials. Part I: Interactions between hindered amine light stabilizers and phenolic antioxidants. Polymer degradation and stability, 110, 498-508.

Blond, E., Boyle, S., Ferrara, M., Herlin, B., Plusquellec, H., Rimoldi, P., & Stark, T. (2019). Applications of Geosynthetics to Irrigation, Drainage and Agriculture. Irrigation and Drainage, 68(1), 67-83.

Bolbasov, E. N., Anissimov, Y. G., Pustovoytov, A. V., Khlusov, I. A., Zaitsev, A. A., Zaitsev, K. V., . . . & Tverdokhlebov, S. I. (2014). Ferroelectric polymer scaffolds based on a copolymer of tetrafluoroethylene with vinylidene fluoride: Fabrication and properties. Materials Science and Engineering: C, 40, 32-41.

Bouyanfif, A., Liyanage, S., Hequet, E., Moustaid-Moussa, N., & Abidi, N. (2019). FTIR microspectroscopy reveals fatty acid-induced biochemical changes in C. elegans. Vibrational Spectroscopy, 102, 8-15.

Bykov, I. (2008). Characterization of natural and technical lignins using FTIR spectroscopy.

Celina, M. C. (2013). Review of polymer oxidation and its relationship with materials performance and lifetime prediction. Polymer Degradation and Stability, 98(12), 2419-2429.

Cole, E. J., Zandvakili, O. R., Xing, B., Hashemi, M., Herbert, S., & Mashayekhi, H. H. (2019). Dataset on the effect of hardwood biochar on soil gravimetric moisture content and nitrate dynamics at different soil depths with FTIR analysis of fresh and aged biochar. Data in brief, 104073.

Cornet, I., Wittner, N., Tofani, G., & Tavernier, S. (2018). FTIR as an easy and fast analytical approach to follow up microbial growth during fungal pretreatment of poplar wood with Phanerochaete chrysosporium. Journal of microbiological methods, 145, 82-86.

Delgado-Mellado, N., Larriba, M., Navarro, P., Rigual, V., Ayuso, M., Garcia, J., & Rodríguez, F. (2018). Thermal stability of choline chloride deep eutectic solvents by TGA/FTIR-ATR analysis. Journal of Molecular Liquids, 260, 37-43.

Desimoni, E., & Brunetti, B. (2015). X-ray photoelectron spectroscopic characterization of chemically modified electrodes used as chemical sensors and biosensors: A review. Chemosensors, 3(2), 70-117.

Devi, K. R., & Madivanane, R. (2012). Normal coordinate analysis of polyvinyl acetate. An International Journal (ESTIJ), ISSN, 2250-3498.

De La Orden, M. U., Montes, J. M., Urreaga, J. M., Bento, A., Ribeiro, M. R., Pérez, E., & Cerrada, M. L. (2015). Thermo and photo-oxidation of functionalized metallocene high density polyethylene: Effect of hydrophilic groups. Polymer degradation and stability, 111, 78-88.

Dirlikov, S. K., & Koenig, J. L. (1979). Assignment of the carbon-hydrogen stretching and bending vibrations of poly (methyl methacrylate) by selective deuteration. Applied Spectroscopy, 33(6), 555-561.

Doménech-Carbó, M. T., Álvarez-Romero, C., Doménech-Carbó, A., Osete-Cortina, L., & Martínez-Bazán, M. L. (2019). Microchemical surface analysis of historic copper-based coins by the combined use of FIB-FESEM-EDX, OM, FTIR spectroscopy and solid-state electrochemical techniques. Microchemical Journal, 148, 573-581.

Drozd, R., Rakoczy, R., Konopacki, M., Frąckowiak, A., & Fijałkowski, K. (2017). Evaluation of usefulness of 2DCorr technique in assessing physicochemical properties of bacterial cellulose. Carbohydrate polymers, 161, 208-218.

Erwanto, Y., Muttaqien, A. T., Sugiyono, Sismindari, & Rohman, A. (2016). Use of Fourier transform infrared (FTIR) spectroscopy and chemometrics for analysis of lard adulteration in "rambak" crackers. International Journal of Food Properties, 19(12), 2718-2725.

Ewais, A. M. R. (2014). Longevity of HDPE geomembranes in geoenvironmental applications (Doctoral dissertation).

Ewais, A. M. R., & Rowe, R. K. (2014). Effect of aging on the stress crack resistance of an HDPE geomembrane. Polymer degradation and stability, 109, 194-208.

Farnet-Da Silva, A. M., Ferre, E., Dupuy, N., de La Boussinière, A., & Rebufa, C. (2017). Infra-red spectroscopy reveals chemical interactions driving water availability for enzyme activities in litters of typical Mediterranean tree species. Soil Biology and Biochemistry, 114, 72-81.

Ghimire, P. P., Dassanayake, A. C., Wickramaratne, N. P., & Jaroniec, M. (2019). Polyvinyl pyrrolidone-assisted synthesis of size-tunable polymer spheres at elevated temperature and their conversion to nitrogen-containing carbon spheres. Journal of colloid and interface science, 549, 162-170.

Ghorpade, V. S., Dias, R. J., Mali, K. K., & Mulla, S. I. (2019). Citric acid crosslinked carboxymethylcellulose-polyvinyl alcohol hydrogel films for extended release of water soluble basic drugs. Journal of Drug Delivery Science and Technology, 52, 421-430.

Gómez-Sánchez, E., Kunz, S., & Simon, S. (2012). ATR/FT-IR spectroscopy for the characterisation of magnetic tape materials. Spectroscopy Europe, 24(1), 6.

Gorassini, A., Adami, G., Calvini, P., & Giacomello, A. (2016). ATR-FTIR characterization of old pressure sensitive adhesive tapes in historic papers. Journal of Cultural Heritage, 21, 775-785.

Gregório, I., Zapata, F., & García-Ruiz, C. (2017). Analysis of human bodily fluids on superabsorbent pads by ATR-FTIR. Talanta, 162, 634-640.

Hamzah, M., Khenfouch, M., Rjeb, A., Sayouri, S., Houssaini, D. S., Darhouri, M., & Srinivasu, V. V. (2018, March). Surface chemistry changes and microstructure evaluation of low density nanocluster polyethylene under natural weathering: A spectroscopic investigation. In Journal of Physics: Conference Series (Vol. 984, No. 1, p. 012010). IOP Publishing.

Hawkins, W. L., Hansen, R. H., Matreyek, W., & Winslow, F. H. (1959). The effect of carbon black on thermal antioxidants for polyethylene. Journal of Applied Polymer Science, 1(1), 37-42.

Heredia, A., Colin-García, M., i Puig, T. P., Alba-Aldave, L., Meléndez, A., Cruz-Castañeda, J. A., . . . & Mendoza, A. N. (2017). Computer simulation and experimental self-assembly of irradiated glycine amino acid under magnetic fields: Its possible significance in prebiotic chemistry. Biosystems, 162, 66-74.

Hsuan, Y. G., & Koerner, R. M. (1998). Antioxidant depletion lifetime in high density polyethylene geomembranes. Journal of Geotechnical and Geoenvironmental Engineering, 124(6), 532-541.

Hua, H., & Dubé, M. A. (2001). Off-line monitoring of butyl acrylate, methyl methacrylate and vinyl acetate homo- and copolymerizations in toluene using ATR-FTIR spectroscopy. Polymer, 42(14), 6009-6018.

Islam, M. (2009). Long-term performance of HDPE geomembranes as landfill liners (Doctoral dissertation).

Jansen, R. B. (2012). Advanced dam engineering for design, construction, and rehabilitation. Springer Science & Business Media.

Jung, M. R., Horgen, F. D., Orski, S. V., Rodriguez, V., Beers, K. L., Balazs, G. H., . . . & Hyrenbach, K. D. (2018). Validation of ATR FT-IR to identify polymers of plastic marine debris, including those ingested by marine organisms. Marine pollution bulletin, 127, 704-716.

Kerr, T. J., Duncan, K. L., & Myers, L. (2013). Application of vibrational spectroscopy techniques for material identification from fire debris. Vibrational Spectroscopy, 68, 225-235.

Koerner, R. M., Hsuan, Y. G., & Koerner, G. R. (2016). Lifetime predictions of exposed geotextiles and geomembranes. Geosynthetics International, 24(2), 198-212.

Koerner, R. M., & Hsuan, Y. G. (2003, June). Lifetime prediction of polymeric geomembranes used in new dam construction and dam rehabilitation. In *Proceedings of State Dam Safety, Officials Conference, Lake Harmony, Pa*. (pp. 4-6).

Koerner, Robert M. Designing with Geosynthetics—6Th Edition; Vol 2 (Kindle Locations 249-250). Kindle Edition.

Koerner, Robert M. Designing with Geosynthetics—6Th Edition; Vol 2 (Kindle Locations 252-255). Kindle Edition.

Krishnaswamy, R. K., & Sukhadia, A. M. (2000). Orientation characteristics of LLDPE blown films and their implications on Elmendorf tear performance. Polymer, 41(26), 9205-9217.

Kumari, L. U., Beegum, M. F., Harikumar, B., Varghese, T. H., & Panicker, C. Y. (2008). Vibrational spectroscopic studies and ab initio calculations of 4-tert butyl benzyl selenocyanate. Rasayan J. Chem, 1, 110-116.

Mani, P., & Suresh, S. (2009). Vibrational spectra and normal coordinate analysis of acetic acid cyclohexyl ester. Rasayan J. Chem, 2, 307-311.

Marcondes, A. R., Ueda, M., Kostov, K. G., Beloto, A. F., Leite, N. F., Gomes, G. F., & Lepienski, C. M. (2004). Improvements of ultra-high molecular weight polyethylene mechanical properties by nitrogen plasma immersion ion implantation. Brazilian journal of physics, 34(4B), 1667-1672.

Mwila, J., Miraftab, M., & Horrocks, A. R. (1994). Effect of carbon black on the oxidation of polyolefins—An overview. Polymer Degradation and Stability, 44(3), 351-356.

Lefèvre, G., Preočanin, T., & Lützenkirchen, J. (2012). Attenuated total reflection-infrared spectroscopy applied to the study of mineral-aqueous electrolyte solution interfaces: a general overview and a case study. Infrared spectroscopy-materials science, engineering and technology, 1, 97-122.

Lewis, P. D., Lewis, K. E., Ghosal, R., Bayliss, S., Lloyd, A. J., Wills, J., . . . & Mur, L. A. (2010). Evaluation of FTIR spectroscopy as a diagnostic tool for lung cancer using sputum. BMC cancer, 10(1), 640.

Liang, Y., Zheng, M., Park, K. H., & Lee, H. S. (2008). Thickness-dependent crystal orientation in poly (trimethylene 2, 6-naphthalate) films studied with GIWAXD and RA-FTIR methods. Polymer, 49(7), 1961-1967.

Liu, H., Chen, T., Qing, C., Xie, Q., & Frost, R. L. (2013). Confirmation of the assignment of vibrations of goethite: An ATR and IES study of goethite structure. Spectrochimica Acta Part A: Molecular and Biomolecular Spectroscopy, 116, 154-159.

Li, M. (2005). Evaluation of oxidative behavior of polyolefin geosynthetics utilizing accelerated aging tests based on temperature and pressure.

Liu, M., Ye, M., Yang, Q., Zhang, Y., Xie, Q., & Yao, S. (2006). A new method for characterizing the growth and properties of polyaniline and poly (aniline-co-o-aminophenol) films with the combination of EQCM and in situ FTIR spectroelectrochemisty. Electrochimica acta, 52(1), 342-352.

Lobo, H., & Bonilla, J. V. (Eds.). (2003). Handbook of plastics analysis (Vol. 68). Crc Press.

Lodi, P. C., & Souza, B. B. D. (2012). Thermo-gravimetric analysis (TGA) after different exposures of High Density Polyethylene (HDPE) and Poly Vinyl Chloride (PVC) geomembranes. Electronic Journal of Geotechnical Engineering, 17, 3339-3349.

Lohse, D. J. (2000). Polyolefins. In Applied polymer science: 21st century (pp. 73-91). Pergamon.

Lou, Y., Cai, H., Liu, X., Tu, S., Pei, K., Zhao, Y., . . . & Cai, B. (2014). Element analysis and characteristic identification of non-fumigated and sulfur-fumigated *Fritillaria thunbergii* Miq. using microwave digestion-inductively coupled plasma atomic emission spectrometry combined with Fourier transform infrared spectrometry. Pharmacognosy magazine, 10(Suppl 1), S30.

Lu, J., Sue, H. J., & Rieker, T. P. (2001). Dual crystalline texture in HDPE blown films and its implication on mechanical properties. Polymer, 42(10), 4635-4646.

Mishra, R., Sapra, B. K., Rout, R. P., & Prajith, R. (2016). Probing the application of Fourier Transform Infrared (FTIR) spectroscopy for assessment of deposited flux of Radon and Thoron progeny in high exposure conditions. Nuclear Instruments and Methods in Physics Research Section A: Accelerators, Spectrometers, Detectors and Associated Equipment, 838, 24-27.

Mitra, S., Ghanbari-Siahkali, A., Kingshott, P., Hvilsted, S., & Almdal, K. (2006). An investigation on changes in chemical properties of pure ethylene-propylene-diene rubber in aqueous acidic environments. Materials chemistry and physics, 98(2-3), 248-255.

Moini, N., Zohuriaan-Mehr, M. J., Kabiri, K., & Khonakdar, H. A. (2019). "Click" on SAP: Superabsorbent polymer surface modification via CuAAC reaction toward antibacterial activity and improved swollen gel strength. Applied Surface Science, 487, 1131-1144.

Morent, R., De Geyter, N., Leys, C., Gengembre, L., & Payen, E. (2008). Comparison between XPS- and FTIR-analysis of plasma-treated polypropylene film surfaces. Surface and Interface Analysis: An International Journal devoted to the development and application of techniques for the analysis of surfaces, interfaces and thin films, 40(3-4), 597-600.

Morrison, W. R., & Corner, A. I. (1995). Use of geomembranes in Bureau of Reclamation canals, reservoirs, and dam rehabilitation. Materials Engineering and Research Laboratory Group, Civil Engineering Services, Technical Service Center, US Bureau of Reclamation.

Mueller, W., & Jakob, I. (2003). Oxidative resistance of high-density polyethylene geomembranes. Polymer Degradation and Stability, 79(1), 161-172.

Mul, G., Hamminga, G. M., & Moulijn, J. A. (2004). Operando ATR-FTIR analysis of liquid-phase catalytic reactions: can heterogeneous catalysts be observed?. Vibrational Spectroscopy, 34(1), 109-121.

Müller, W. W., Jakob, I., Li, C., & Tatzky-Gerth, R. (2009). Antioxidant depletion and OIT values of high impact PP strands. Chinese Journal of Polymer Science, 27(03), 435-445.

Novak, P. (2007). Moffat. AIB, Nalluri, C. and Narayanan, R., Hydraulic Structures.

Olsztynska-Janus, S., Gąsior-Głogowska, M., Szymborska-Małek, K., Czarnik-Matusewicz, B., & Komorowska, M. (2011). Specific applications of vibrational spectroscopy in biomedical engineering. Biomedical engineering, trends, research and technologies, 91-120.

Pang, S. F., Wu, C. Q., Zhang, Q. N., & Zhang, Y. H. (2015). The structural evolution of magnesium acetate complex in aerosols by FTIR-ATR spectra. Journal of Molecular Structure, 1087, 46-50.

Peggs, I. D. (2006). Geomembrane Liners In Wastewater Treatment Ponds: Whales and Their Prevention. *Land and Water,* 50(4), 38-41.

Peña, J. M., Allen, N. S., Edge, M., Liauw, C. M., & Valange, B. (2001). Studies of synergism between carbon black and stabilisers in LDPE photodegradation. Polymer degradation and stability, 72(2), 259-270.

Pena, J. M., Allen, N. S., Edge, M., Liauw, C. M., Santamaria, F., Noiset, O., & Valange, B. (2001). Factors affecting the adsorption of stabilisers on to carbon black (flow micro-calorimetry and FTIR studies) Part I Primary phenolic antioxidants. Journal of materials science, 36(12), 2885-2898.

Pena, J. M., Allen, N. S., Edge, M., Liauw, C. M., Noiset, O., & Valange, B. (2001). Factors affecting the adsorption of stabilisers on to carbon black (flow micro-calorimetry studies) Part II Hindered amine light stabilisers (HALS). Journal of materials science, 36(18), 4419-4431.

Pereira, A. P. D. S., Silva, M. H. P. D., Júnior, L., Pereira, É., Paula, A. D. S., & Tommasini, F. J. (2017). Processing and Characterization of PET Composites Reinforced With Geopolymer Concrete Waste. Materials Research, 20, 411-420.

Pfaffeneder-Kmen, M., Casas, I. F., Naghilou, A., Trettenhahn, G., & Kautek, W. (2017). A Multivariate Curve Resolution evaluation of an in-situ ATR-FTIR spectroscopy investigation of the electrochemical reduction of graphene oxide. Electrochimica Acta, 255, 160-167.

Phease, T. L., Billingham, N. C., & Bigger, S. W. (2000). The effect of carbon black on the oxidative induction time of medium-density polyethylene. Polymer, 41(26), 9123-9130.

Pourfarzad, A., Najafi, M. B. H., Khodaparast, M. H. H., & Khayyat, M. H. (2015). Serish inulin and wheat biopolymers interactions in model systems as a basis for understanding the impact of inulin on bread properties: a FTIR investigation. Journal of food science and technology, 52(12), 7964-7973.

Rajendran, S., Mahendran, O., & Kannan, R. (2002). Characterisation of [(1–x) PMMA-xPVdF] polymer blend electrolyte with Li+ ion. Fuel, 81(8), 1077-1081.

Rekha, P. S., & Gunasekaran, S. (2018). A novel spectroscopic analysis to detect photochemical reaction of the bronchodilator-Doxofylline and its estimation in pharmaceutical formulation. Spectrochimica Acta Part A: Molecular and Biomolecular Spectroscopy, 190, 140-149.

Ries, M. D., & Pruitt, L. (2005). Effect of cross-linking on the microstructure and mechanical properties of ultrahigh molecular weight polyethylene. Clinical Orthopaedics and Related Research®, 440, 149-156.

Rimal, S. (2009). Ageing of HDPE geomembranes used to contain landfill leachate or hydrocarbon spills (Doctoral dissertation).

Rodríguez-Vázquez, M., Liauw, C. M., Allen, N. S., Edge, M., & Fontan, E. (2006). Degradation and stabilisation of poly (ethylene-stat-vinyl acetate): 1-Spectroscopic and rheological examination of thermal and thermo-oxidative degradation mechanisms. Polymer Degradation and stability, 91(1), 154-164.

Rohman, A., Windarsih, A., Riyanto, S., Sudjadi, Shuhel Ahmad, S. A., Rosman, A. S., & Yusoff, F. M. (2016). Fourier transform infrared spectroscopy combined with multivariate calibrations for the authentication of avocado oil. International journal of food properties, 19(3), 680-687.

Rouillon, C., Bussiere, P. O., Desnoux, E., Collin, S., Vial, C., Therias, S., & Gardette, J. L. (2016). Is carbonyl index a quantitative probe to monitor polypropylene photodegradation?. Polymer degradation and stability, 128, 200-208.

Rowe, R. K., Rimal, S., Arnepalli, D. N., & Bathurst, R. J. (2010). Durability of fluorinated high density polyethylene geomembrane in the Arctic. Geotextiles and Geomembranes, 28(1), 100-107.

Rowe, R. K., & Sangam, H. P. (2002). Durability of HDPE geomembranes. *Geotextiles and Geomembranes,* 20(2), 77-95.

Rowe, R. K., Islam, M. Z., & Hsuan, Y. G. (2008). Leachate chemical composition effects on OIT depletion in an HDPE geomembrane. Geosynthetics International, 15(2), 136-151.

Sangam, H. P., & Rowe, R. K. (2002). Effects of exposure conditions on the depletion of antioxidants from high-density polyethylene (HDPE) geomembranes. Canadian Geotechnical Journal, 39(6), 1221-1230.

Sanches, N. B., Cassu, S. N., & Dutra, R. D. C. L. (2015). TG/FT-IR characterization of additives typically employed in EPDM formulations. Polímeros, 25(3), 247-255.

Scheirs, J. (2009). A guide to polymeric geomembranes: a practical approach. John Wiley & Sons.

Shen, Y., Wang, L., Wu, Y., Li, X., Zhao, Q., Hou, Y., & Teng, W. (2015). Facile solvothermal synthesis of MnFe2O4 hollow nanospheres and their photocatalytic degradation of benzene investigated by in situ FTIR. Catalysis Communications, 68, 11-14.

Stark, T. D., & Hynes, J. M. (2009). Geomembranes for canal lining. In *Proceedings of geosynthetics*.

Surov, O. V., Voronova, M. I., Afineevskii, A. V., & Zakharov, A. G. (2018). Polyethylene oxide films reinforced by cellulose nanocrystals: Microstructure-properties relationship. Carbohydrate polymers, 181, 489-498.

Tahermansouri, H., & Abedi, E. (2014). One-pot functionalization of short carboxyl multi-walled carbon nanotubes with ninhydrin and thiourea via microwave and thermal methods and their effect on MKN-45 and MCF7 cancer cells. Fullerenes, Nanotubes and Carbon Nanostructures, 22(9), 834-844.

Tamilselvi, A., Jayakumar, G. C., Charan, K. S., Sahu, B., Deepa, P. R., Kanth, S. V., & Kanagaraj, J. (2019). Extraction of cellulose from renewable resources and its application in leather finishing. Journal of Cleaner Production, 230, 694-699.

Trivedi, M., Branton, A., Trivedi, D., Shettigar, H., Bairwa, K., & Jana, S. (2015). Fourier transform infrared and ultraviolet-visible spectroscopic characterization of biofield treated salicylic acid and sparfloxacin. Natural Products Chemistry & Research, 3(5).

Ugbolue, S. C. (Ed.). (2017). Polyolefin Fibres: Structure, Properties and Industrial Applications. Woodhead Publishing.

Urbaniak-Domagala, W. (2012). The use of the spectrometric technique FTIR-ATR to examine the polymers surface. Advanced aspects of spectroscopy, 3, 85-104.

Van Santvoort, G. P. (Ed.). (1994). Geotextiles and geomembranes in civil engineering. CRC Press.

Wong, W. K. (2011). Evaluation of the oxidative degradation mechanism of corrugated high-density polyethylene pipe and the pipe resin.

Wong, W. K., & Hsuan, Y. G. (2014). Interaction of antioxidants with carbon black in polyethylene using oxidative induction time methods. Geotextiles and Geomembranes, 42(6), 641-647.

Wong, W. K. C., & Hsuan, G. Y. (2016). Effects of Carbon Black on the Depletion of Antioxidants in HDPE under Air and Water Conditions. Geosynthetics, Forging a Path to Bona Fide Engineering Materials: Honoring, 61.

Yamina, A. M., Fizir, M., Itatahine, A., He, H., & Dramou, P. (2018). Preparation of multifunctional PEG-graft-halloysite nanotubes for controlled drug release, tumor cell targeting, and bio-imaging. Colloids and Surfaces B: Biointerfaces, 170, 322-329.

Yang, P., Yang, H., Wang, N., Du, C., Pang, S., & Zhang, Y. (2020). Hygroscopicity measurement of sodium carbonate, β-alanine and internally mixed β-alanine/Na2CO3 particles by ATR-FTIR. Journal of Environmental Sciences, 87, 250-259.

Ye, H. M., Song, Y. Y., Xu, J., Guo, B. H., & Zhou, Q. (2013). Melting behavior of inclusion complex formed between polyethylene glycol oligomer and urea. Polymer, 54(13), 3385-3391.

Zieba-Palus, J. (2017). The usefulness of infrared spectroscopy in examinations of adhesive tapes for forensic purposes. Forensic Science and Criminology http://www.gseworld.com/content/documents/technical-notes/Standard_OIT_vs_HP_OIT_Technical_Note.pdf

What is claimed is:

1. A geomembrane comprising:
   polyethylene,
   from 3000 ppm to 4000 ppm of a phenolic antioxidant,
   from 500 ppm to 1000 ppm of a phosphite antioxidant,
   from 4000 ppm to 6000 ppm of a hindered amine light stabilizer, and
   from 1.5 wt % to 3.5 wt % of carbon black, the polyethylene, the phenolic antioxidant, the hindered amine light stabilizer, and the carbon black amount to 100 wt % of the geomembrane; and
   the geomembrane has
   (i) a thickness from 0.5 mm to 1.0 mm; and
   (ii) a carbonyl index from 0.217 to 0.382 after 180 days forced air aging at 85° C.

2. The geomembrane of claim 1, wherein the polyethylene comprises high density polyethylene (HDPE).

3. The geomembrane of claim 1, wherein the phenolic antioxidant comprises an alkylated monophenol, an alkylthio methyl phenol, a hydroxylated thiodiphenylether, an alkylidene bisphenol, a hydroxybenzylated malonate, an aromatic hydroxybenzyl compound, a triazine compound, a benzylphosphonate, or an acylaminophenol.

4. The geomembrane of claim 1, wherein the phenolic antioxidant comprises an aromatic hydroxybenzyl compound comprising 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, or 2,4,6-tris(3,5-di-tert-butyl-4-hydroxybenzyl)phenol.

5. The geomembrane of claim 1, wherein the phenolic antioxidant comprises 3,3',3',5,5',5'-hexa-tert-butyl-a,a',a'-(mesitylene-2,4,6-triyl)tri-p-cresol.

6. The geomembrane of claim 1, wherein the phenolic antioxidant is present in the geomembrane from 3000 ppm to 3500 ppm.

7. The geomembrane of claim 1, wherein the phosphite antioxidant comprises a triphenylphosphite, a diphenylalkylphosphite, a phenyldialkylphosphite, a tri(nonylphenyl)phosphite, a trilaurylphosphite, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl)pentaerythritoldiphosphite, tristearylsorbitoltriphosphite, bis(2,4-di-tert-butylphenyl-6-methylphenyl)ethylphosphite, or 2-ethylhexyl(3,3',5,5'-tetra-tert-butyl-1,1'-biphenyl-2,2'-diyl))phosphite.

8. The geomembrane of claim 1, wherein the phosphite antioxidant comprises a substituted triphenyl phosphite.

9. The geomembrane of claim 1, wherein the phosphite antioxidant comprises tris(2,4-di-tert-butylphenyl)phosphite.

10. The geomembrane of claim 1, wherein the phosphite antioxidant is present in the geomembrane at 500 ppm.

11. The geomembrane of claim 1, wherein the hindered amine light stabilizer comprises a hydroxybenzophenone, a hydroxyphenyl benzotriazole, a cyanoacrylate, an oxanilide, a hydroxyphenyl triazine, or any combination thereof.

12. The geomembrane of claim 1, wherein the hindered amine light stabilizer comprises 4-hydroxy-2,2,6,6-tetramethyl-1-piperidine ethanol; poly[[6-((1,1,3,3-tetramethylbutyl)amino)-1,3,5-triazine2,4diyl][(2,2,6,6-tetramethyl-4-piperidyl)imino]hexamethylene[2,2,6,6-tetramethyl-4-piperidyl)imino]]; or 1,5,8,12-Tetrakis[4,6-bis(N-butyl-N-1,2,2,6,6-pentamethyl-4-piperidylamino)-1,3,5-triazin-2-yl]-1,5,8,12-tetraazadodecane.

13. The geomembrane of claim 1, wherein the hindered amine light stabilizer comprises poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

14. The geomembrane of claim 1, wherein the hindered amine light stabilizer is present in the geomembrane from 4000 ppm to 5000 ppm.

15. The geomembrane of claim 1, wherein the carbon black has a density of from about 1.0 gm/cm$^3$ to about 1.5 gm/cm$^3$.

16. The geomembrane of claim 1, wherein the carbon black is present in the geomembrane of from 2.0 weight percent to 3.0 weight percent.

17. The geomembrane of claim 1 wherein the geomembrane has a thickness of 1.0 mm.

18. A geomembrane comprising:
   polyethylene;
   a phenolic antioxidant that is 3,3',3',5,5',5'-hexa-tert-butyl-a,a',a'-(mesitylene-2,4,6-triyl)tri-p-cresol;
   a phosphite antioxidant that is (2,4-di-tert-butylphenyl)phosphite;
   a hindered amine light stabilizer that is poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]; and
   carbon black having a density of 1.139 gm/cm$^3$.

19. The geomembrane of claim 18 comprising
   the polyethylene;
   3500 ppm of the phenolic antioxidant;
   500 ppm of the phosphite antioxidant;
   2.5 wt % of the carbon black; and the polyethylene, the phenolic antioxidant, the hindered amine light stabilizer, and the carbon black amount to 100 wt % of the geomembrane.

20. The geomembrane of claim 19 wherein the geomembrane has
   (i) a thickness from 0.5 mm to 1.0 mm; and
   (ii) a carbonyl index from 0.217 to 0.382 after 180 days forced air aging at 85° C.

* * * * *